(12) United States Patent
Yamazaki et al.

(10) Patent No.: US 9,667,457 B2
(45) Date of Patent: May 30, 2017

(54) RADIO COMMUNICATION DEVICE AND SIGNAL PROCESSING METHOD

(71) Applicant: KYOCERA CORPORATION, Kyoto (JP)

(72) Inventors: Chiharu Yamazaki, Ota-ku (JP); Masato Fujishiro, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/867,944

(22) Filed: Sep. 28, 2015

(65) Prior Publication Data

US 2016/0020929 A1     Jan. 21, 2016

Related U.S. Application Data

(63) Continuation of application No. PCT/JP2014/057771, filed on Mar. 20, 2014.
(Continued)

(30) Foreign Application Priority Data

Oct. 29, 2013     (JP) .................................. 2013-224772

(51) Int. Cl.
*H04L 27/00*     (2006.01)
*H04B 1/38*     (2015.01)
(Continued)

(52) U.S. Cl.
CPC ........ *H04L 25/4906* (2013.01); *H04B 1/0483* (2013.01); *H04J 11/00* (2013.01);
(Continued)

(58) Field of Classification Search
USPC ....... 375/219, 220, 221, 222, 211, 295, 300, 375/298, 302, 315, 316, 320, 322, 324,
(Continued)

(56) References Cited

U.S. PATENT DOCUMENTS 4,660,099 A  *  4/1987  Sugiyama ............... G11B 20/10
                                                              360/48
5,319,675 A       6/1994  Osaka
(Continued)

FOREIGN PATENT DOCUMENTS

JP     5-122088 A     5/1993

OTHER PUBLICATIONS

International Search Report issued in Application No. PCT/JP2014/057771, mailed Apr. 22, 2014.
(Continued)

*Primary Examiner* — Linda Wong
(74) *Attorney, Agent, or Firm* — Studebaker & Brackett PC

(57) ABSTRACT

A radio communication device comprises a processor configured to generate a transmission signal on the basis of data to be transmitted. The processor generates the transmission signal by a transmission scheme selected from a digital transmission scheme and an analog transmission scheme. The digital transmission scheme is a transmission scheme by which a bit stream obtained through binary encoding of the data to be transmitted is converted into the transmission signal. The analog transmission scheme is a transmission scheme by which the data to be transmitted directly is converted into the transmission signal without performing binary encoding of the data to be transmitted.

31 Claims, 17 Drawing Sheets

Related U.S. Application Data

(60) Provisional application No. 61/806,280, filed on Mar. 28, 2013.

(51) Int. Cl.

| | | |
|---|---|---|
| *H04L 25/49* | (2006.01) | |
| *H04J 11/00* | (2006.01) | |
| *H04L 27/18* | (2006.01) | |
| *H04L 1/00* | (2006.01) | |
| *H04L 5/00* | (2006.01) | |
| *H04L 25/02* | (2006.01) | |
| *H04L 27/34* | (2006.01) | |
| *H04B 1/04* | (2006.01) | |
| *H04L 1/24* | (2006.01) | |

(52) U.S. Cl.
CPC .......... *H04L 1/0003* (2013.01); *H04L 1/0023* (2013.01); *H04L 1/0026* (2013.01); *H04L 1/248* (2013.01); *H04L 5/0048* (2013.01); *H04L 25/021* (2013.01); *H04L 25/0226* (2013.01); *H04L 25/0242* (2013.01); *H04L 27/18* (2013.01); *H04L 27/34* (2013.01); *H04L 27/3488* (2013.01)

(58) Field of Classification Search
USPC .................................. 375/329, 340, 356, 358
See application file for complete search history.

(56) References Cited

U.S. PATENT DOCUMENTS

| | | | | |
|---|---|---|---|---|
| 5,392,463 A * | 2/1995 | Yamada | ................ | H03F 1/0261 330/284 |
| 6,154,505 A * | 11/2000 | Konishi | ................... | H03D 5/00 348/729 |
| 7,505,531 B1 * | 3/2009 | Pasternak | ............. | H04L 1/0041 332/103 |
| 9,129,592 B2 * | 9/2015 | Pahuja | ................ | G10L 21/0208 |
| 2001/0033625 A1 * | 10/2001 | Ninomiya | ........... | H04L 27/0008 375/316 |
| 2003/0028876 A1 * | 2/2003 | Eguchi | .................. | G06F 13/385 725/38 |
| 2003/0137670 A1 * | 7/2003 | Barbato | ................ | A61B 5/0059 356/497 |
| 2003/0179835 A1 * | 9/2003 | Tsubouchi | ............ | H03J 1/0008 375/316 |
| 2005/0159179 A1 * | 7/2005 | Sainton | ................... | H04L 12/14 455/552.1 |
| 2005/0265436 A1 * | 12/2005 | Suh | ........ | H04L 1/0026 375/221 |
| 2007/0133711 A1 * | 6/2007 | Li | .......................... | H04B 1/406 375/295 |
| 2008/0178215 A1 * | 7/2008 | Nishigaki | ............ | H04N 5/4401 725/38 |
| 2010/0238998 A1 * | 9/2010 | Nanbu | ................ | H03M 7/4006 375/240.03 |
| 2010/0260234 A1 | 10/2010 | Thomas et al. | | |
| 2010/0265901 A1 | 10/2010 | Koo et al. | | |
| 2013/0034148 A1 * | 2/2013 | Heng | .................... | H04N 19/91 375/240.02 |
| 2013/0195145 A1 * | 8/2013 | Soliman | .................. | H04B 1/69 375/130 |

OTHER PUBLICATIONS

Written Opinion issued in Application No. PCT/JP2014/057771, mailed Apr. 22, 2014.

3GPP TS 36.211 V11.1.0 (Dec. 2012) 3rd Generation Partnership Project; Technical Specification Group Radio Access Network; Evolved Universal Terrestrial Radio Access (E-UTRA); Physical Channels and Modulation (Release 11).

The extended European search report issued by the European Patent Office on Oct. 4, 2016, which corresponds to European Patent Application No. 14775169.7-1874 and is related to U.S. Appl. No. 14/867,944.

Motorola; "Direct channel feedback for obtaining channel state information at Node B in EUTRA"; 3GPP TSG RAN WG1 TDD Ad Hoc; R1-071863; Apr. 17-20, 2007; pp. 1-3; Beijing, China.

* cited by examiner

FIG. 8
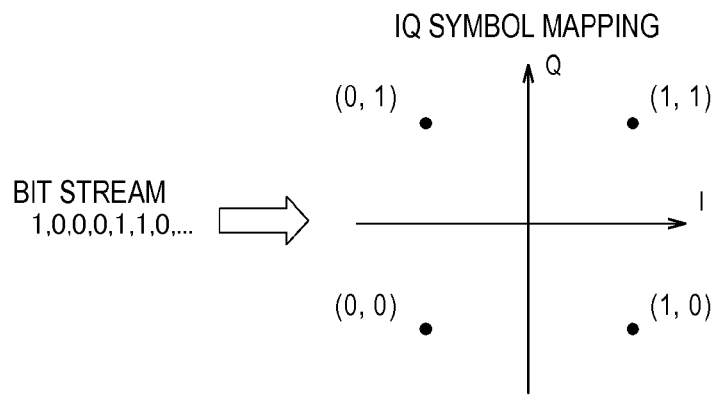
FIG. 9
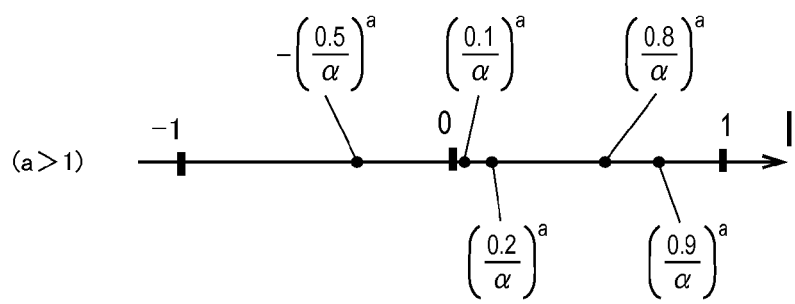
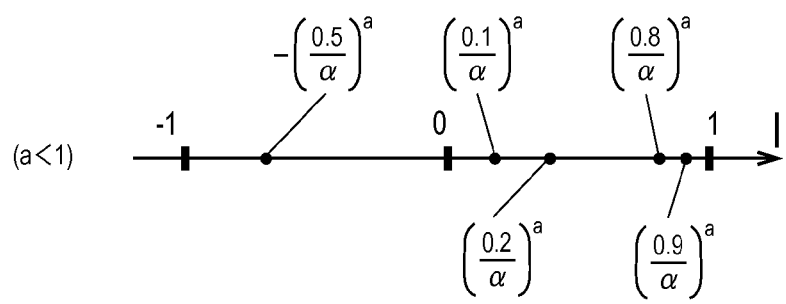
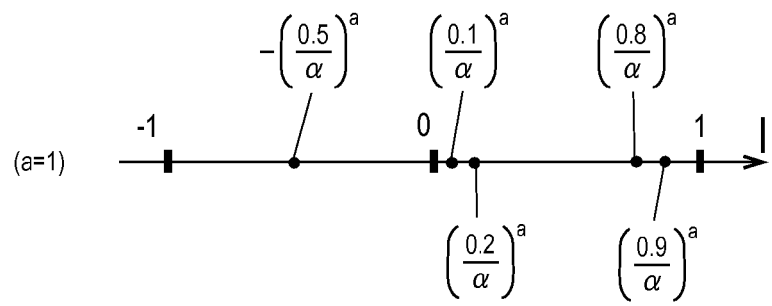

eSRS LEGACY SRS

CSI

DMRS

SRS

RADIO COMMUNICATION DEVICE AND SIGNAL PROCESSING METHOD

TECHNICAL FIELD

The present disclosure relates to a radio communication device in which a transmission signal is generated by signal processing and a signal processing method.

BACKGROUND ART

In the recent years, a digital transmission scheme has become popular in radio communications. A radio communication device configured to use a digital transmission scheme performs various types of signal processing including quantization, binary encoding, and symbol mapping when generating a transmission signal from an analog value as the data to be transmitted (for example, see Non Patent Document 1).

Quantization is processing performed to approximately substitute an analog value that is a continuous quantity by a discrete value such as an integer. Binary encoding is processing performed to convert the discrete value obtained through quantization to a binary number (that is, a bit stream). Symbol mapping is processing performed to convert the bit stream obtained through binary encoding to a transmission symbol (that is, digital modulation).

PRIOR ART DOCUMENT

Non-Patent Document

Non Patent Document 1: 3GPP technical specifications "TS 36.211 V11.1.0" December, 2012

SUMMARY OF THE DISCLOSURE

While it is difficult for a transmission error to occur in the above-described digital transmission scheme, the transmission bit length needs to be increased in order to improve the resolution of the data to be transmitted, which results in the problem of a stringent channel capacity.

On the other hand, because the channel capacity also increases if the channel quality is good, a mechanism by which the resolution is changed in an adaptive manner according to the channel quality is considered, but the overheads resulting from the signaling for realizing the mechanism are also a cause of the channel capacity becoming more stringent.

Thus, the present disclosure provides a radio communication device and a signal processing method with which it is possible to obtain a resolution in an adaptive manner in accordance with a channel quality, without increasing overheads.

A radio communication device according to the present disclosure comprises a processor configured to generate a transmission signal on the basis of data to be transmitted. The processor generates the transmission signal by a transmission scheme selected from a digital transmission scheme and an analog transmission scheme. The digital transmission scheme is a transmission scheme by which a bit stream obtained through binary encoding of the data to be transmitted is converted into the transmission signal. The analog transmission scheme is a transmission scheme by which the data to be transmitted directly is converted into the transmission signal without performing binary encoding of the data to be transmitted.

BRIEF DESCRIPTION OF THE DRAWINGS

FIG. 8 is a diagram for describing an operation of a digital transmission processing unit according to the first embodiment.

FIG. 9 is a diagram for describing an operation of an analog transmission processing unit according to the first embodiment.

DESCRIPTION OF THE EMBODIMENT

Overview of Embodiments

Figure 1:
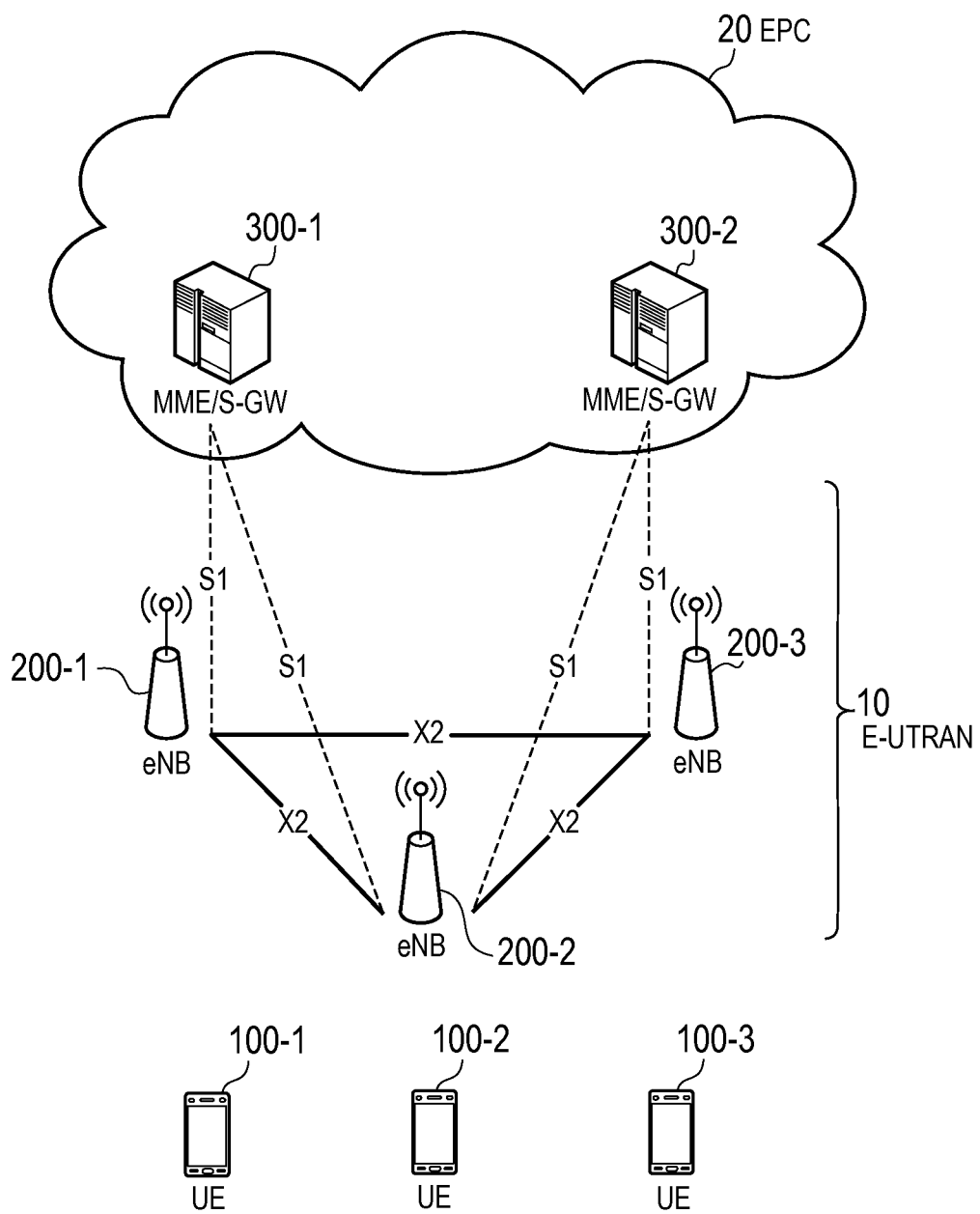
FIG. 1 is a configuration diagram of an LTE system according to a first embodiment to a sixth embodiment.

A radio communication device according to a first embodiment to a sixth embodiment comprises a processor configured to generate a transmission signal on the basis of data to be transmitted. The processor generates the transmission signal by a transmission scheme selected from a digital transmission scheme and an analog transmission scheme. The digital transmission scheme is a transmission scheme by which a bit stream obtained through binary encoding of the data to be transmitted is converted into the transmission signal. The analog transmission scheme is a transmission scheme by which the data to be transmitted directly is converted into the transmission signal without performing binary encoding of the data to be transmitted.

In the first embodiment to the sixth embodiment, the data to be transmitted consists of an analog value, or a value obtained by quantizing the analog value.

In the first embodiment to the sixth embodiment, the processor selects a transmission scheme applied to the data to be transmitted, from the digital transmission scheme and the analog transmission scheme, on the basis of an attribute of the data to be transmitted.

In the first embodiment to the sixth embodiment, the processor selects the analog transmission scheme as the transmission scheme to be applied to the data to be transmitted for which the inclusion of an error is permitted at a time of transmission.

In the first embodiment to the sixth embodiment, the processor selects the analog transmission scheme as the transmission scheme applied to the data to be transmitted that consists of channel information obtained through channel estimation in the radio communication device.

In the first embodiment, the processor performs direct symbol mapping for converting the data to be transmitted into a transmission symbol, in the analog transmission scheme.

In the first embodiment, the processor converts the data to be transmitted into a transmission symbol by performing amplitude modulation-phase modulation, or modulation with respect to two independent axes on an IQ plane, in the symbol mapping.

In the first embodiment, the processor further performs resource mapping to map a reference signal to a first radio resource, and to map the transmission symbol to a second radio resource, in the analog transmission scheme. In the resource mapping, the processor arranges the second radio resource in the vicinity of the first radio resource.

In the second embodiment, the processor performs in the analog transmission scheme: symbol mapping to convert reference data into a transmission symbol, and precoding to generate the transmission signal by applying the data to be transmitted to the transmission symbol.

In the second embodiment, the processor further performs resource mapping to map a reference signal to a first radio resource, and to map the transmission symbol to which the data to be transmitted has been applied to a second radio resource, in the analog transmission scheme. In the resource mapping, the processor arranges the second radio resource in the vicinity of the first radio resource.

The third embodiment relates to a resource mapping in the first embodiment and the second embodiment. In the third embodiment, the reference signal is sounding reference signal. The first radio resource is a first resource element corresponding to a last symbol of an uplink subframe. The second radio resource is a second resource element corresponding to a second symbol from an end of the uplink subframe.

In the third embodiment, the reference signal is sounding reference signal. The first radio resource is a first resource element corresponding to a last symbol of an uplink subframe. The second radio resource is a second resource element corresponding to a last symbol of the uplink subframe.

Alternatively, in the third embodiment, the reference signal is demodulation reference signal. The first radio resource is a first resource element corresponding to a predetermined symbol of an uplink subframe. The second radio resource is a second resource element corresponding to a symbol adjacent to the predetermined symbol.

In the third embodiment, the uplink subframe includes a first region used as physical uplink control channel and a second region used as physical uplink shared channel. The second resource element is a resource element belonging to the second region.

In the third embodiment, when the radio communication device and other radio communication device perform transmission of the transmission symbol by the analog transmission scheme, the processor uses, for the transmission of the transmission symbol, a resource element different from a resource element used by the other radio communication device.

In the fourth embodiment, the processor notifies, of a communication partner device in the analog transmission scheme, a range of values of the data to be transmitted or a magnification of the transmission signal with respect to the data to be transmitted.

In the fourth embodiment, the data to be transmitted is each component contained in a channel response array. In the analog transmission scheme, the processor normalizes other components by a specific component contained in the channel response array so as to skip the transmission of the specific component.

In the fourth embodiment, the data to be transmitted is each component contained in a channel response array. Each component contained in the channel response array includes an amplitude. In the analog transmission scheme, the processor performs resource mapping such that the number of transmission symbols on which each component containing the amplitude is placed becomes substantially uniform in each interval of the symbol.

In the fourth embodiment, the data to be transmitted is each component contained in a covariance matrix corresponding to a channel response array. Each component contained in the covariance matrix includes an amplitude. In the analog transmission scheme, the processor performs resource mapping such that the number of transmission symbols on which each component containing the amplitude is placed becomes substantially uniform in each interval of the symbol.

In the fourth embodiment, the data to be transmitted is each component contained in a covariance matrix corresponding to a channel response array. In the analog transmission scheme, the processor performs special signal processing on a diagonal component contained in the covariance matrix. The special signal processing is at least one of a process in which a transmission symbol on which the diagonal component is placed is compared with other symbols and redundantly transmitted and a process in which a pair of diagonal components is mapped on one signal point on an IQ plane.

In the fourth embodiment, the data to be transmitted is each component contained in a channel response array. Each component contained in the channel response array includes an I component and a Q component. In the analog transmission scheme, the processor places the I component and the Q component on separated transmission symbols.

In the fifth embodiment, in the analog transmission scheme, the processor generates not only a transmission symbol carrying the data to be transmitted but also a transmission symbol carrying redundancy data corresponding to the data to be transmitted. The redundancy data is the same data as the data to be transmitted or data different from the data to be transmitted, from which the data to be transmitted is derived.

In the fifth embodiment, the processor generates an error detection code corresponding to the data to be transmitted in the analog transmission scheme, and notifies a communication partner device of the error detection code. The processor is configured to directly map the data to be transmitted to a signal point on an IQ plane, derive a bit stream corresponding to the directly mapped signal point on the basis of correspondence between the signal point and the bit stream in the digital transmission scheme, and generate the error detection code from the derived bit stream.

In the fifth embodiment, the processor divides an IQ plane into a plurality of regions for management. In the analog transmission scheme, the processor directly maps the data to be transmitted to a signal point on an IQ plane so as to generate the transmission symbol. The processor notifies a communication partner device of a region identifier as an error detection code indicating a region to which the signal point belongs among the plurality of regions.

In the fifth embodiment, in the analog transmission scheme, when the data to be transmitted is converted into a transmission symbol, the processor sets a reference value on an I axis and a reference value on a Q axis to be larger than the origin such that the transmission symbol is not mapped to the vicinity of the origin on an IQ plane.

In the fifth embodiment, the processor divides a range of values of the data to be transmitted into a plurality of numerical ranges for management. In the analog transmission scheme, the processor notifies a communication partner device of a range identifier indicating a target numerical range to which the data to be transmitted belongs among the plurality of numerical ranges. In the analog transmission scheme, the processor transmits the data to be transmitted which is converted in accordance with a magnification rate of the entire range where the transmission is allowed with respect to the target numerical range.

A radio communication device according to the first embodiment to the sixth embodiment is configured to receive a transmission signal generated on the basis of data to be transmitted. The transmission signal is generated by a transmission scheme selected from a digital transmission scheme and an analog transmission scheme. The digital transmission scheme is a transmission scheme by which a bit stream obtained through binary encoding of the data to be transmitted is converted into the transmission signal. The analog transmission scheme is a transmission scheme by which the data to be transmitted directly is converted into the transmission signal without performing binary encoding of the data to be transmitted.

In the sixth embodiment, the radio communication device further comprises: a receiver configured to receive a first transmission signal transmitted from a first user terminal connected to the radio communication device and receive a second transmission signal transmitted from a second user terminal; and a processor configured to notify of at least one of information indicating a first resource element to which the first transmission signal generated by the analog transmission scheme is mapped and information indicating a second resource element to which the second transmission signal generated by the analog transmission scheme is mapped.

In the sixth embodiment, the first resource element and the second resource element are set not to be overlapped in at least one of a frequency direction and a time direction.

In the sixth embodiment, the processor notifies the first user terminal of control information for making the first user terminal reduce interference onto the second resource element.

In the sixth embodiment, the second user terminal is a user terminal configured to be connected to the radio communication device. The processor notifies the second user terminal of control information for making the second user terminal reduce interference onto the first resource element.

In the sixth embodiment, the receiver receives the first transmission signal as a desired signal, and receives the second transmission signal as an interference signal. The processor performs an interference canceling process on a composite signal of the first transmission signal and the second transmission signal in the first resource element in a case where the second transmission signal generated by the digital transmission scheme is mapped to the first resource element. The interference canceling process includes a process of generating a replica of the second transmission signal in the first resource element and a process of subtracting the replica from the composite signal.

In the sixth embodiment, the second user terminal is a user terminal configured to be connected to another radio communication device. The processor acquires a transmission signal parameter from the another radio communication device, the transmission signal parameter being applied to the second transmission signal generated by the digital transmission scheme.

In the sixth embodiment, the processor notifies the another radio communication device of a resource block and a subframe including the first resource element in order to acquire the transmission signal parameter.

In the sixth embodiment, the transmission signal parameter includes at least one of the number of transmission antennas, a modulation and coding scheme (MCS), a redundancy version, a transmission mode, the number of layers, a transmission precoder matrix index (TPMI), a resource block, information indicating a demodulation reference signal (DMRS) sequence, setting information of a sounding reference signal (SRS), and a power difference between the DMRS and a physical uplink shared channel (PUSCH).

In the sixth embodiment, the process of generating the replica includes a process of demodulating data contained in the second transmission signal in the first resource element on the basis of the transmission signal parameter, and a process of generating the replica from the demodulated data.

A signal processing method according to the first embodiment to the third embodiment is a method for generating a transmission signal on the basis of data to be transmitted. The method comprises: a step of generating, in a processor, the transmission signal by a transmission scheme selected from a digital transmission scheme and an analog transmission scheme. The digital transmission scheme is a transmission scheme by which a bit stream obtained through binary encoding of the data to be transmitted is converted into the transmission signal. The analog transmission scheme is a transmission scheme by which the data to be transmitted directly is converted into the transmission signal without performing binary encoding of the data to be transmitted.

First Embodiment

Hereinafter, with reference to the accompanying drawings, an embodiment in a case where the present disclosure is applied to LTE (Long Term Evolution) which is standardized by 3GPP (3rd Generation Partnership Project) will be described.

(Configuration of LTE System)

FIG. 1 is a configuration diagram of an LTE system according to a first embodiment. As shown in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 corresponds to a radio access network and the EPC 20 corresponds to a core network. The E-UTRAN 10 and the EPC 20 forms a network of the LTE system.

The UE 100 is a mobile communication device and performs radio communication with a cell (a serving cell) with which a connection is established. The UE 100 corresponds to a user terminal.

The E-UTRAN 10 includes a plurality of eNBs 200 (evolved Node-Bs). The eNB 200 corresponds to a base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes a plurality of MME (Mobility Management Entity)/S-GWs (Serving-Gateways) 300. The MME is a network node for performing various mobility controls and the like for the UE 100 and corresponds to a controller. The S-GW is a network node that performs control to transfer user data and corresponds to a mobile switching center. The EPC 20 including the MME/S-GW 300 accommodates the eNB 200.

The eNBs 200 are connected mutually via an X2 interface. Further, the eNB 200 is connected to the MME/S-GW 300 via an S1 interface.

Next, the configurations of the UE 100 and the eNB 200 will be described.

Figure 2:
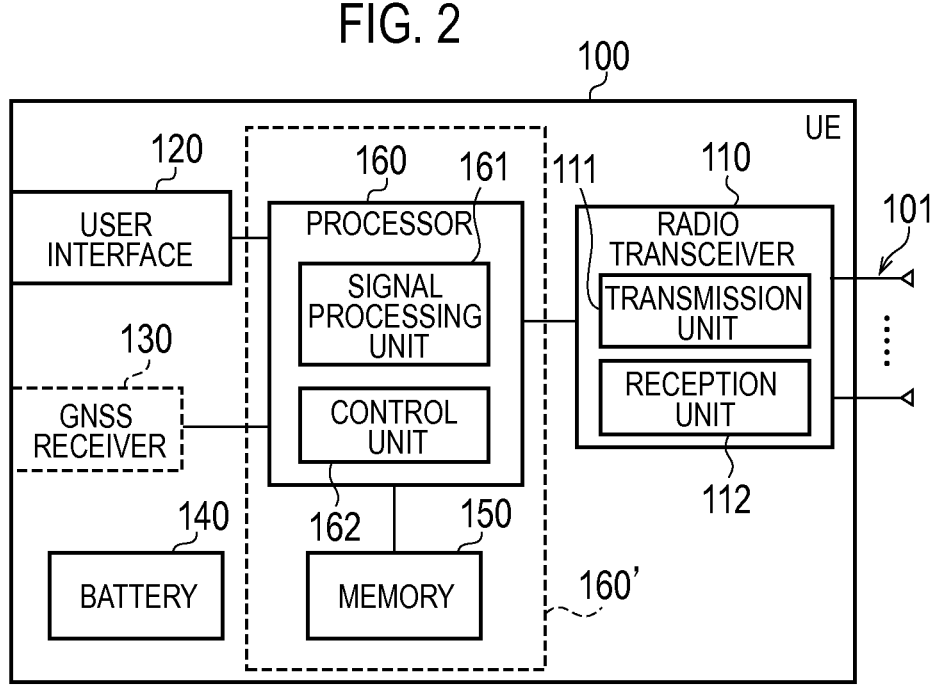
FIG. 2 is a block diagram of UE according to the first embodiment to the sixth embodiment.

FIG. 2 is a block diagram of the UE 100. As shown in FIG. 2, the UE 100 includes a plurality of antennas 101, a radio transceiver 110, a user interface 120, a GNSS (Global Navigation Satellite System) receiver 130, a battery 140, a memory 150, and a processor 160. The UE 100 may not necessarily include the GNSS receiver 130. Further, the memory 150 may be integrally formed with the processor 160, and this set (that is, a chip set) may be called a processor 160'.

The plurality of antennas 101 and the radio transceiver 110 are used to transmit and receive a radio signal. The radio transceiver 110 includes a transmission unit 111 that converts a baseband signal (a transmission signal) output from the processor 160 into a radio signal and transmits the radio signal from the plurality of antennas 101. Further, the radio transceiver 110 includes a reception unit 112 that converts a radio signal received by the plurality of antennas 101 into a baseband signal (a reception signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a signal processing unit 161 that performs signal processing such as modulation and demodulation, encoding and decoding on the baseband signal, and a control unit 162 that performs various controls by executing the program stored in the memory 150. The processor 160 may further include a codec that performs encoding and decoding on sound and video signals. The processor 160 executes various controls and various communication protocols described later.

Figure 3:
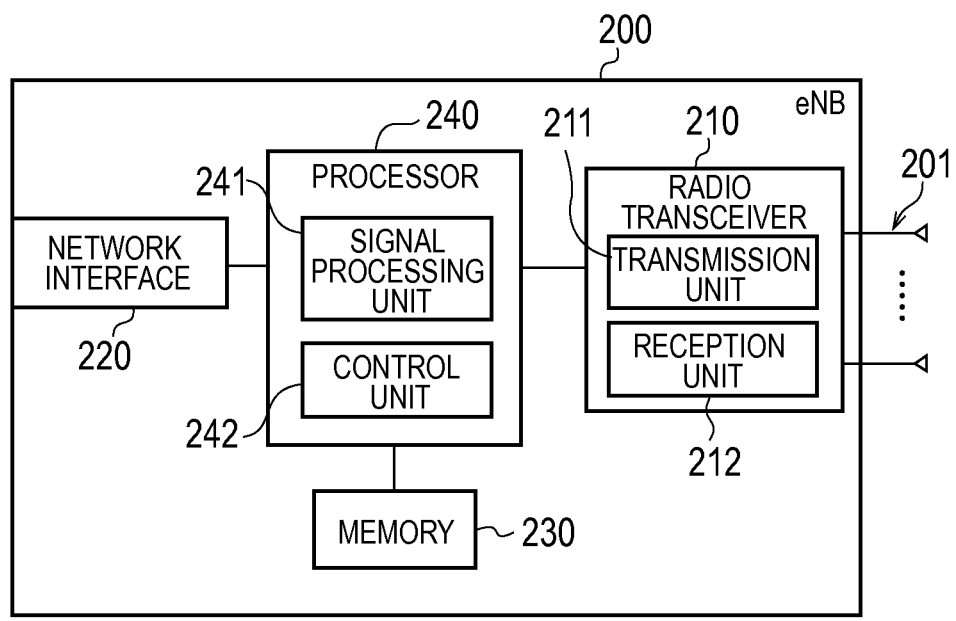
FIG. 3 is a block diagram of eNB according to the first embodiment to the sixth embodiment.

FIG. 3 is a block diagram of the eNB 200. As shown in FIG. 3, the eNB 200 includes a plurality of antennas 201, a radio transceiver 210, a network interface 220, a memory 230, and a processor 240. The memory 230 and the processor 240 configure a control unit at the base station side.

The plurality of antennas 201 and the radio transceiver 210 are used to transmit and receive a radio signal. The radio transceiver 210 includes a transmission unit 211 that converts a baseband signal (a transmission signal) output from the processor 240 into a radio signal and transmits the radio signal from the plurality of antennas 201. Further, the radio transceiver 210 includes a reception unit 212 that converts a radio signal received by the plurality of antennas 201 into a baseband signal (a reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes a signal processing unit 241 that performs signal processing such as modulation and demodulation, encoding and decoding on the baseband signal, and a control unit 242 that performs various controls by executing the program stored in the memory 230. The processor 240 executes various controls and various communication protocols described later.

Figure 4:
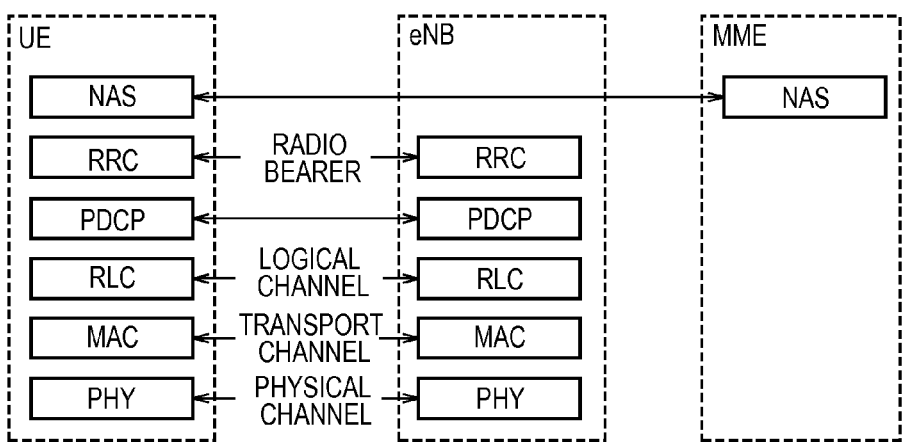
FIG. 4 is a protocol stack diagram of a radio interface in the LTE system.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size and a modulation and coding scheme (MCS)) and a scheduler for deciding a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (a RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (a RRC connected state), and when there is no RRC connection, the UE 100 is in an idle state (a RRC idle state).

A NAS (Non-Access Stratum) layer positioned above the RRC layer performs session management, mobility management and the like.

Figure 5:
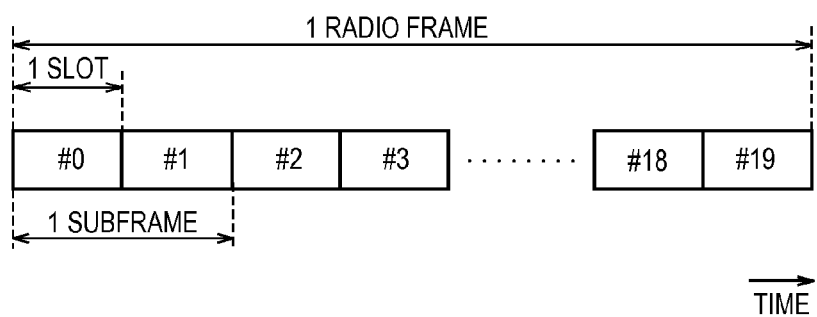
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively. As a duplex scheme, either FDD (Frequency Division Duplex) or TDD (Time Division Duplex) is applied. However, in the first embodiment, the FDD scheme is mainly assumed.

As shown in FIG. 5, the radio frame consists of 10 subframes arranged in a time direction, wherein each subframe consists of two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. A radio resource unit composed by one subcarrier and one symbol is called a resource element (RE).

Among radio resources assigned to the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Further, the other interval of each subframe is a region available as a physical downlink shared channel (PDSCH) for mainly transmitting user data.

The PDCCH carries a control signal. The control signal, for example, includes an uplink SI (Scheduling Information), a downlink SI, and a TPC bit. The uplink SI is information indicating the assignment of an uplink radio resource and the downlink SI is information indicating the assignment of a downlink radio resource. The TPC bit is information for instructing an increase or decrease in the uplink transmission power. These types of information are called downlink control information (DCI).

The PDSCH carries at least one of a control signal and user data. For example, a downlink data region may be assigned only to the user data, or assigned such that the user data and the control signal are multiplexed.

Further, in a downlink, a cell-specific reference signal (CRS) and a channel-state-information reference signal (CSI-RS) are arranged to be dispersed in each subframe. Each of the CRS and the CSI-RS is composed by a predetermined orthogonal signal sequence. The eNB 200 transmits the CRS and CSI-RS from each of the plurality of antennas 201.

In the uplink, both ends of each subframe in the frequency direction are control regions used as a physical uplink control channel (PUCCH) for mainly transmitting a control signal. Further, the central portion in the frequency direction of each subframe is a region mainly capable of being used as a physical uplink shared channel (PUSCH) for transmitting user data.

The PUCCH carries a control signal. The control signal, for example, includes CQI (Channel Quality Indicator), PMI (Precoding Matrix Indicator), RI (Rank Indicator), SR (Scheduling Request), and ACK/NACK. The CQI is an index indicating the downlink channel quality and is used for deciding a recommended modulation scheme and a coding rate to be used in downlink transmission, for example. The PMI is an index indicating a precoder matrix that is preferable to be used for the downlink transmission. The RI is an index indicating the number of layers (the number of streams) available for the downlink transmission. The SR is information for requesting the assignment of an uplink radio resource (a resource block). The ACK/NACK is information indicating whether or not a signal transmitted via a downlink physical channel (for example, the PDSCH) has been successfully decoded.

The CQI, PMI, and RI correspond to the channel information (CSI; Channel State Information) acquired by the UE 100 by performing channel estimation using the downlink reference signal (at least one of CRS and CSI-RS), and then using a codebook. The details are described later, but in the present embodiment, rather than feeding back CSI as an index, the CSI is fed back as a direct value.

The PUSCH carries at least one of a control signal and user data. For example, an uplink data region may be assigned only to the user data, or assigned such that the user data and the control signal are multiplexed.

Further, in an uplink, a sounding reference signal (SRS) and a demodulation reference signal (DMRS) are provided in the predetermined symbols of each subframe. Each of the SRS and the DMRS is composed by a predetermined orthogonal signal sequence.

Signal Processing According to First Embodiment

A solution for effectively using a radio frequency is the effective utilization of a space channel by multi-antenna techniques such as single user/multi-user MIMO and eNB-to-eNB linkage. However, such multi-antenna techniques depend on the accuracy of channel estimation, and particularly, when applying to a downlink channel, it becomes important to know the downlink channel information at the side of the eNB 200.

In a TDD system, channel estimation is performed through the reception of the uplink channel by the eNB 200, and the channel reversibility can be used and applied to the downlink channel, which makes it possible to acquire highly accurate downlink channel information at the side of the eNB 200 in a relatively easy manner.

On the other hand, in an FDD system, after estimating a downlink channel at the side of the UE 100, the channel information needs to be fed back to the eNB 200. As for the feedback information, if the overheads on the uplink channel are not taken into consideration, highly accurate channel information can be sent, but in reality, the overheads cannot be ignored, which results in the use of mechanisms such as performing appropriate quantization to generate a codebook, for example.

However, this method basically has a channel estimation error due to the quantization error. Here, if the granularity of quantization is fixed, a trade-off occurs between the overheads and channel estimation accuracy, and moreover, if an attempt is made to adjust the granularity of quantization in accordance with the availability of the uplink channel capacity, the mechanism itself generates overheads.

Figure 6:
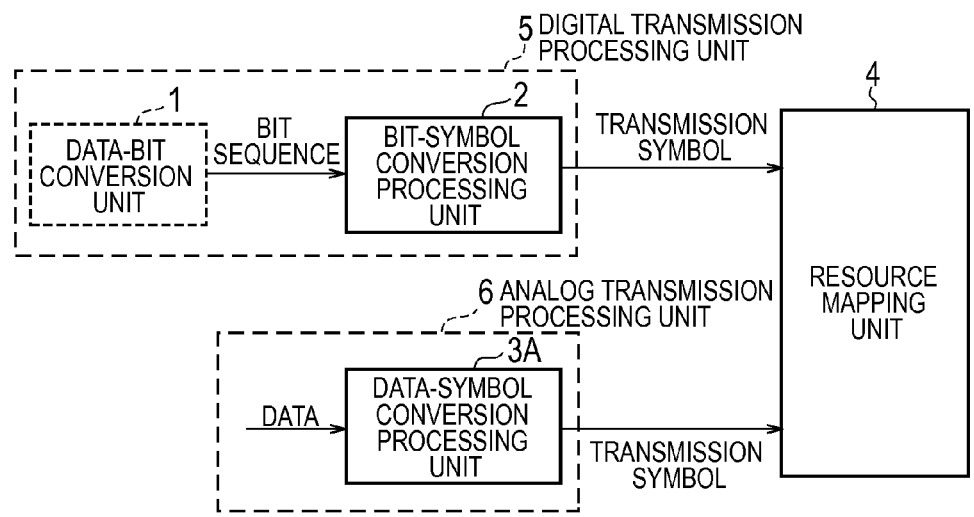
FIG. 6 is a block diagram of a signal processing unit of UE according to the first embodiment to the sixth embodiment.

Thus, in the first embodiment, by introducing the signal processing described below, channel information feedback, by which a resolution can be obtained in an adaptive manner in accordance with the channel quality, without causing an increase in overheads, is realized. FIG. 6 is a block diagram of the signal processing unit 161 of the UE 100 according to the first embodiment.

As shown in FIG. 6, the signal processing unit 161 configured to generate a transmission signal on the basis of the data to be transmitted includes a digital transmission processing unit 5, an analog transmission processing unit 6, and a resource mapping unit 4.

The digital transmission processing unit 5 generates a transmission signal by a digital transmission scheme in accordance with the current 3GPP standards. The digital transmission scheme is a transmission scheme by which a bit stream obtained through binary encoding of the data to be transmitted is converted into a transmission signal.

The digital transmission processing unit 5 includes a data-bit conversion unit 1 and a bit-symbol conversion processing unit 2. The data-bit conversion unit 1 performs binary encoding of the data to be transmitted, and converts it into a bit stream. However, if the data to be transmitted is a bit stream, the data-bit conversion unit 1 need not to be provided. The bit-symbol conversion processing unit 2 maps (that is, performs digital modulation) the bit stream to a transmission symbol, and outputs the transmission symbol.

Moreover, the digital transmission processing unit 5 may further include an error correction encoding unit configured to perform error correction encoding on the bit stream. In such a case, the bit-symbol conversion processing unit 2 maps the bit stream after the error correction encoding to the transmission symbol. In addition, the bit-symbol conversion processing unit 2 may include a precoding processing unit configured to perform precoding on the transmission symbol.

On the other hand, the analog transmission processing unit 6 generates a transmission signal by the analog transmission scheme according to the first embodiment. The analog transmission scheme is a transmission scheme by which the data to be transmitted is directly converted into a transmission signal without performing binary encoding of the data to be transmitted. In the circumstances when a DSP (Digital Signal Processor) is used for implementation, the analog transmission scheme may also handle digital values or discrete values.

The analog transmission processing unit 6 includes a data-symbol conversion processing unit 3A configured to perform direct symbol mapping for converting the data to be transmitted into a transmission symbol. The data to be transmitted may be an analog value, or may be a value obtained by quantizing an analog value. The analog transmission processing unit 6 may further include an error correction encoding unit configured to perform error correction encoding on the data to be transmitted.

Figure 7:
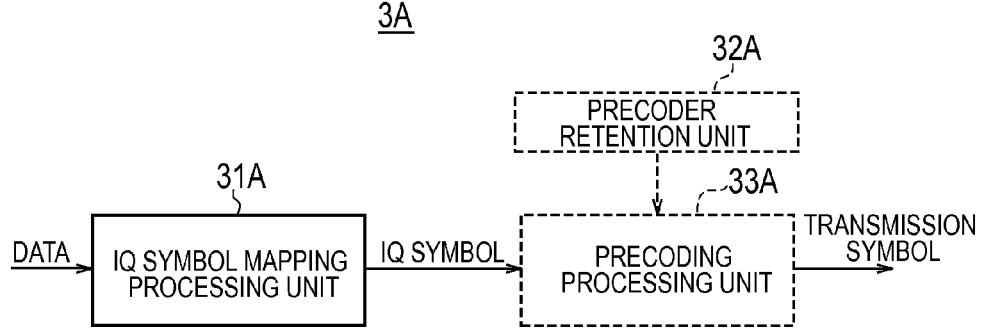
FIG. 7 is a block diagram of a data-symbol conversion processing unit in the analog transmission processing unit according to the first embodiment.

FIG. 7 is a block diagram of a data-symbol conversion processing unit 3A in the analog transmission processing unit 6. As shown in FIG. 7, the data-symbol conversion processing unit 3A includes an IQ symbol mapping processing unit 31A configured to convert the data to be transmitted into a transmission symbol by performing amplitude modulation-phase modulation, or modulation with respect to two independent axes on the IQ plane. The analog transmission processing unit 6 may further include a precoder retention unit 32A configured to retain a precoder (a precoder array) that is known at a receiving side, and a precoding processing unit 33A configured to apply (multiply) the precoder to the transmission symbol and output it. The "precoder that is known at the receiving side" is any one of: 1) a precoder that is the same as the precoder applied to a reference signal, 2) a precoder that is predetermined in the system, and 3) a precoder of which the receiving side is notified either at the same time as data transmission or beforehand.

The operation of the digital transmission processing unit 5 and the operation of the analog transmission processing unit 6 will now be explained through comparison.

FIG. 8 is a diagram for describing an operation of a digital transmission processing unit 5. As shown in FIG. 8, the digital transmission processing unit 5 maps (performs digital modulation) a bit stream to a transmission symbol according to a modulation method, such as QPSK or QAM, and then outputs the transmission symbol.

FIG. 9 is a diagram for describing an operation of an analog transmission processing unit 6. As shown in FIG. 9, the analog transmission processing unit 6 directly maps the data to be transmitted that is not converted into a bit stream, to the I axis or the IQ plane. The mapping to y (range of values [−1, 1]) on the I axis when the range of values of the data to be transmitted 'x' is assumed to be [−α, α] (α>0) is determined by equation (1) described below, for example.

$$y = \mathrm{sgn}(x)\left(\frac{|x|}{\alpha}\right)^a \quad \text{(Equation 1)}$$

If it is assumed that a>1, with the value of a as a parameter, a high resolution is obtained the larger the absolute value of x becomes, and if it is assumed that a<1, a high resolution is obtained the smaller the absolute value of x becomes, and when a=1, linear mapping occurs.

Thus, the signal processing unit 161 according to the first embodiment generates a transmission signal by a transmission scheme selected from the digital transmission scheme and the analog transmission scheme.

On the basis of the attributes of the data to be transmitted, the control unit 162 selects the transmission scheme suitable for the data to be transmitted from the digital transmission scheme and the analog transmission scheme.

In the first embodiment, the control unit 162 selects the analog transmission scheme as the transmission scheme applied to the data to be transmitted in which the inclusion of an error is permitted at the time of transmission (data for which the best effort may be sufficient to reduce the errors included therein). Specifically, the control unit 162 selects the analog transmission scheme as the transmission scheme applied to the data to be transmitted that consists of the channel information (CSI) obtained through channel estimation in the UE 100. Here, the "Channel information" is a channel response array, a covariance matrix, a diagonal component of a covariance matrix, information including such absolute values, or information in which such values are compressed, for example.

In contrast, the control unit 162 selects the digital transmission scheme as the transmission scheme applied to the data to be transmitted in which the inclusion of an error is not permitted at the time of transmission (data for which the errors included therein must be reduced).

The resource mapping unit 4 performs resource mapping to map the reference signal to a first radio resource (hereinafter, called "reference signal resource"), and to map the transmission symbol to a second radio resource. The reference signal is at least one of an SRS and a DMRS, for example.

The resource mapping unit 4 arranges the second radio resource to which the transmission symbol output by the analog transmission processing unit 6 (hereinafter, called "analog symbol") is mapped in the vicinity of the reference signal resource. The "vicinity of the reference signal resource" may be the position of a resource element adjacent to a resource element corresponding to the reference signal resource.

The reference signal and the transmission symbol after the resource mapping are transmitted to the receiving side (the eNB 200) by the transmission unit 211. The signal processing unit 241 of the eNB 200 performs channel estimation on the basis of the reference signal from the UE 100, and performs demodulation and decoding of the transmission symbol received from the UE 100.

As for the analog symbol, the signal processing unit 241 of the eNB 200 directly detects the data to be transmitted (the transmitted analog amount) by correlating the received reference signal and the received analog symbol. Specifically, the signal processing unit 241 of the eNB 200 equalizes the received analog symbol by the uplink channel information required by the reference signal, and detects the value indicated by the analog symbol after equalization as the data to be transmitted. Note that rather than the reference signal, the channel information may be estimated from the decoding result of the digital symbol of the data received separately at the receiving side (the eNB 200), and the result may be used to equalize the received analog symbol.

Note that in the signal processing according to the first embodiment, it is necessary to identify at the receiving side (the eNB 200), the resource (the resource element) to which the analog symbol is mapped.

For this, it would be better for the receiving side to preliminarily know that the data to which the analog transmission scheme is applied is transmitted and to preliminarily also know the resource. For example, this corresponds to a situation where the eNB 200 know the CSI feedback timing, and the UE 100 performs transmission at that timing.

Alternatively, it would be better for the control unit 162 to separately notify the receiving side of transmitting the data to which the analog transmission scheme is applied and for the receiving side to preliminarily also know the resource. For example, this corresponds to a situation where the CSI feedback timing is decided by the UE 100, which then performs transmission, and the resource is already known at the eNB 200 side as long as the UE 100 notifies of the timing.

Alternatively, it would be better for the control unit 162 to notify the receiving side of transmitting the data to which the analog transmission scheme is applied and the resource. For example, this corresponds to a situation where the transmitting side arbitrarily transmits any analog data such as audio or the like.

Note that with regard to the resource used in data transmission to which the analog transmission scheme is applied, puncturing may be performed after mapping the data to which the digital transmission scheme is applied, or data mapping may be performed by using only other than the resource.

Operation According to First Embodiment

Figure 10:
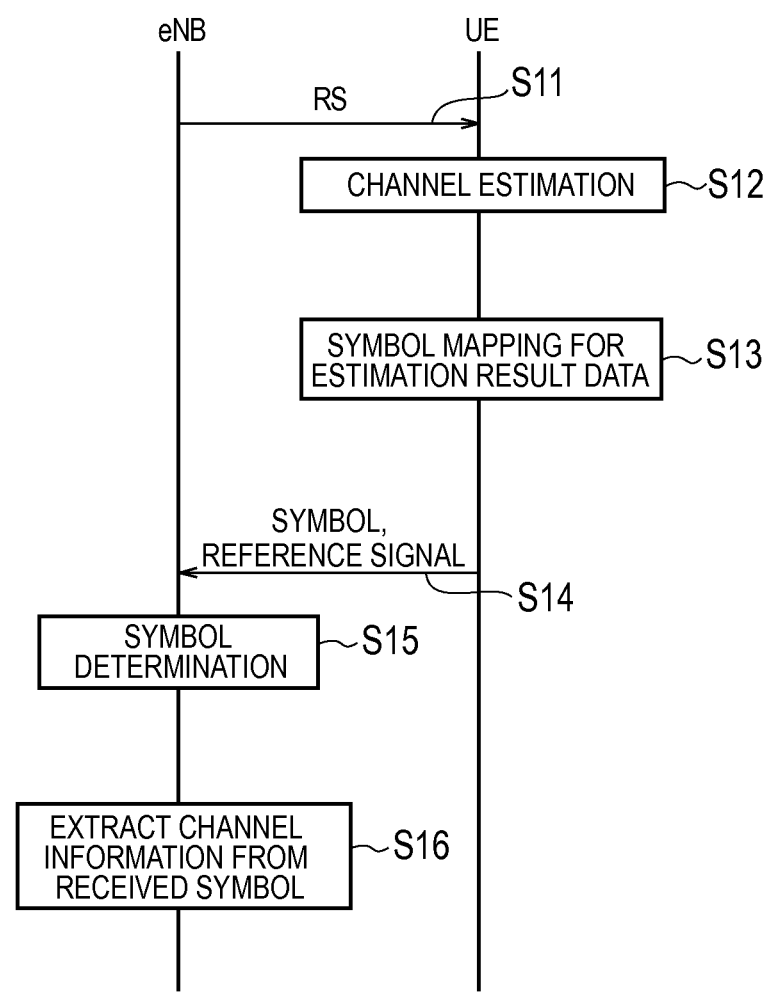
FIG. 10 is an operation sequence diagram according to the first embodiment.

FIG. 10 is an operation sequence diagram according to the first embodiment. The operation concerning the CSI feedback will be described next.

As shown in FIG. 10, in step S11, the UE 100 receives a downlink reference signal (CRS or CSI-RS) from the eNB 200.

In step S12, the UE 100 performs channel estimation on the basis of the downlink reference signal (CRS or CSI-RS).

In step S13, the UE 100 sets the channel information obtained through channel estimation as the data to be transmitted, and then converts the data to be transmitted into an analog symbol by the analog transmission scheme.

In step S14, the UE 100 transmits the analog symbol and the uplink reference signal (SRS or DMRS) to the eNB 200.

In step S15, the eNB 200 performs symbol determination of the analog symbol on the basis of the analog symbol and uplink reference signal from the UE 100.

In step S16, the eNB 200 detects (extracts) the channel information as the data to be transmitted by the symbol determination.

As described above, by applying the analog transmission scheme to CSI feedback (hereinafter, called "embodiment method"), the following effect is obtained as compared to the case when the digital transmission scheme is applied to CSI feedback (hereinafter, called "conventional method").

In the case of the conventional method, the main causes of the CSI error are:

A1) Channel estimation error of the UE 100, and

A2) Quantization error during mapping to the CSI.

On the other hand, in the case of the embodiment, the main causes of the CSI error are:

B1) Channel estimation error of the UE 100,

B2) Error during the analog symbol generation in the UE 100, and

B3) Estimation error of the reference signal and analog symbol during the reception of the analog symbol in the eNB 200.

Here, B1) is equivalent to A1) of the conventional method, and if it is assumed that the effect of B2) is sufficiently low and can be ignored, the remaining is A2) and B3). B3) is mainly caused by the received SINR of the eNB 200. That is, even if no special mechanism is added, theoretically it is the same as the change in the accuracy of the CSI in an adaptive manner in accordance with the quality of the uplink channel. In addition, the accuracy of the CSI can be improved not only by the design of the communication system, but also by the signal processing and scheduling implemented by the eNB 200, for example.

If the conventional method and the embodiment method are compared from the viewpoint of the feedback information amount (that is, the overheads), for example, if the transmission of a 4×4 complex matrix is considered, the value of each element of the 16 symbols can be fed back if the analog transmission scheme is used. On the other hand, if an attempt is made to perform transmission with the same 16 symbols using the conventional method, it results in 10 bits for QPSK (two bits per one symbol) and an encoding rate of ⅓, which implies that not even one bit is fulfilled per one element, and even in the case of 64 QAM (six bits per one symbol) and an encoding rate of ⅚, it results in 80 bits, which implies that a resolution of only five bits can be ensured per one element.

Thus, according to the first embodiment, a resolution can be obtained in an adaptive manner in accordance with a channel quality, without increasing overheads.

Second Embodiment

Hereinafter, a second embodiment will be described while focusing on the differences from the first embodiment. In the second embodiment, the configuration of the analog transmission processing unit 6 is different from that of the first embodiment. Other configurations are equal to those of the first embodiment.

Figure 11:
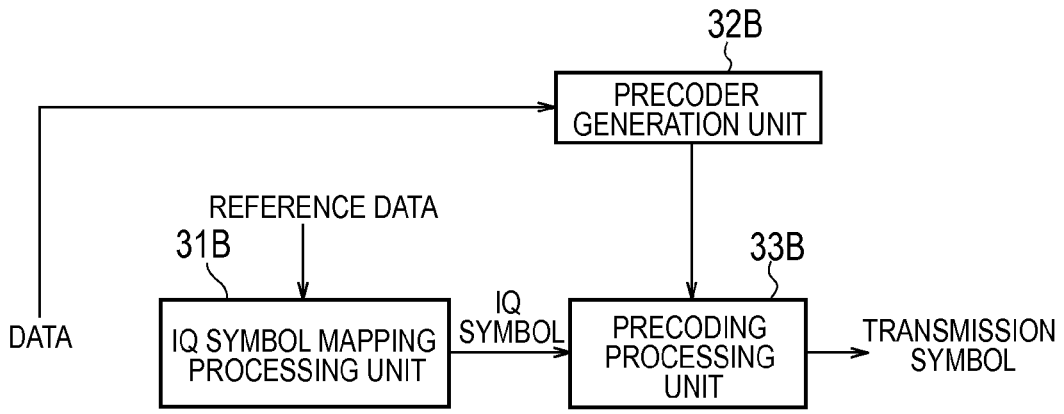
FIG. 11 is a block diagram of a data-symbol conversion processing unit in the analog transmission processing unit according to the second embodiment.

FIG. 11 is a block diagram of a data-symbol conversion processing unit 3B in the analog transmission processing unit 6 according to the second embodiment.

As shown in FIG. 11, the data-symbol conversion processing unit 3B includes an IQ symbol mapping processing unit 31B configured to convert the reference data into a transmission symbol, a precoder generation unit 32B configured to generate the data to be transmitted as a precoder, and a precoding processing unit 33B configured to apply (multiply) the data to be transmitted to the transmission symbol and generates a transmission signal. Here, the reference data may be a known signal sequence (for example, a reference signal sequence), or any other data. Further, the data to be transmitted may be an analog value, or may be a value obtained by quantizing an analog value.

In the second embodiment, the data-symbol conversion processing unit 3B in the analog transmission processing unit 6 modifies the equation (1) described in the first embodiment, and outputs the transmission symbol (analog symbol) based on equation (2) described below.

$$y = \text{sgn}(x)\left(\frac{|x|}{\alpha}\right)^a d \qquad \text{(Equation 2)}$$

Here, "d" is a known signal sequence (for example, a reference signal sequence), for example.

Further, in the second embodiment, same as the first embodiment, the resource mapping unit 4 arranges the second radio resource to which the transmission symbol (analog symbol) output by the analog transmission processing unit 6 is mapped in the vicinity of the reference signal resource.

The reference signal and the transmission symbol after the resource mapping are transmitted to the receiving side (the eNB 200) by the transmission unit 211. The signal processing unit 241 of the eNB 200 performs channel estimation on the basis of the reference signal from the UE 100, and performs demodulation and decoding of the transmission symbol received from the UE 100.

As for the analog symbol, the signal processing unit 241 of the eNB 200 detects the precoder to be applied to the analog symbol as the data to be transmitted (the transmitted analog amount) by correlating the reference signal and the analog symbol. Specifically, if the reference signal and the source of the analog symbol are the same, the data to be transmitted can be detected if a correlation can be derived as is (that is, if channel equalization is performed). Alternatively, if the reference signal and the source of the analog symbol are different, the data to be transmitted can be detected through the same channel equalization as described above after deducting the difference of the IQ signal.

Figure 12:
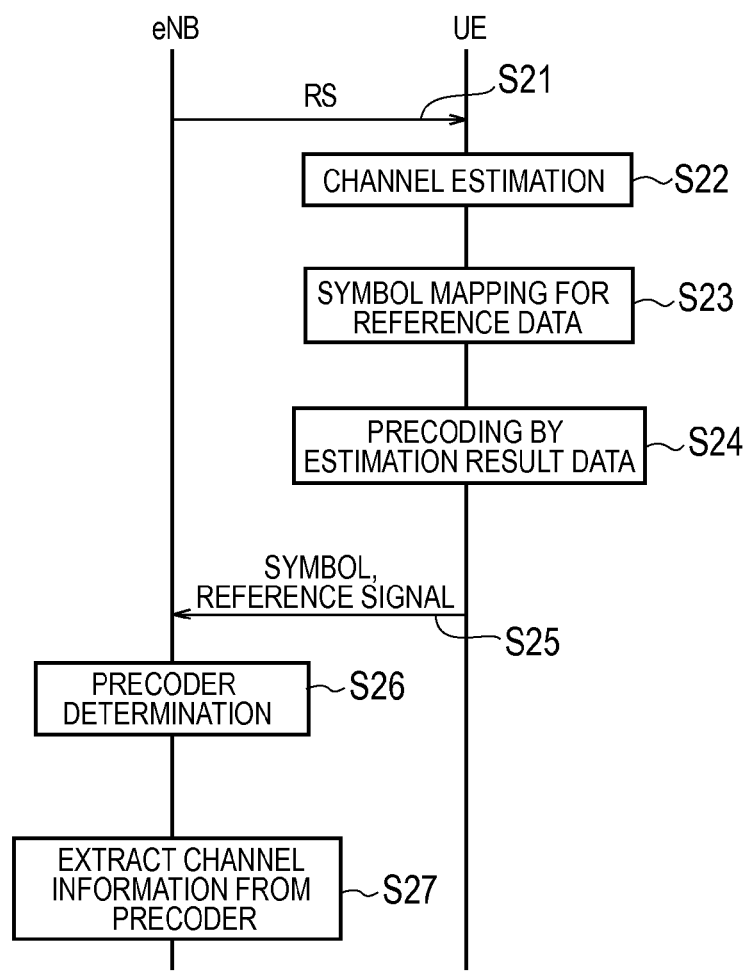
FIG. 12 is an operation sequence diagram according to the second embodiment.

FIG. 12 is an operation sequence diagram according to the second embodiment. The operation concerning the CSI feedback will be described next.

As shown in FIG. 12, in step S21, the UE 100 receives a downlink reference signal (CRS or CSI-RS) from the eNB 200.

In step S22, the UE 100 performs channel estimation on the basis of the downlink reference signal (CRS or CSI-RS).

In step S23, the UE 100 converts the reference data into a transmission symbol by performing symbol mapping.

In step S24, the UE 100 applies the channel information (the data to be transmitted) obtained through channel estimation to the transmission symbol as the precoder, and then converts it into an analog symbol.

In step S25, the UE 100 transmits the analog symbol and the uplink reference signal (SRS or DMRS) to the eNB 200.

In step S26, the eNB 200 determines the precoder applied to the analog symbol on the basis of the analog symbol and uplink reference signal from the UE 100.

In step S27, the eNB 200 detects (extracts) the channel information as the data to be transmitted by performing precoder determination.

Thus, according to the second embodiment, same as the first embodiment, a resolution can be obtained in an adaptive manner in accordance with a channel quality, without increasing overheads.

Third Embodiment

Hereinafter, a third embodiment will be described on a difference from the first embodiment and the second embodiment. The third embodiment is an embodiment concerning resource mapping. The resource mapping based on the second embodiment will be described mainly.

Figure 13:
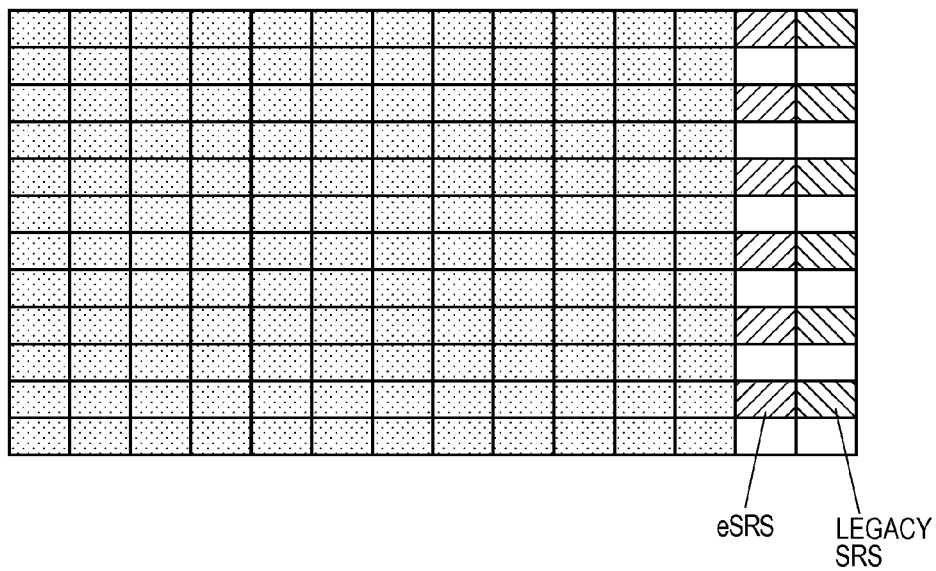
FIG. 13 is a diagram for describing a pattern 1 of resource mapping according to the third embodiment.
Figure 14:
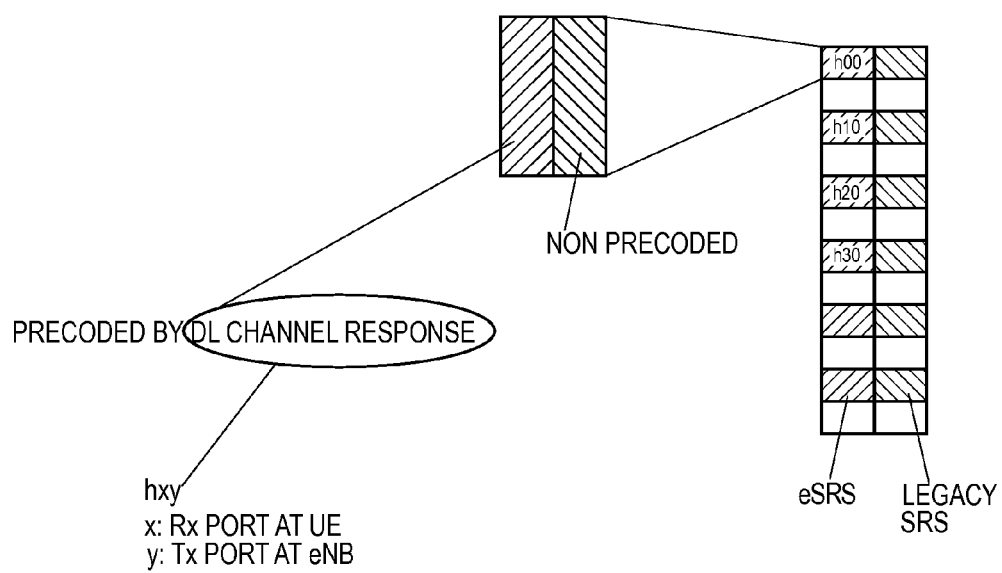
FIG. 14 is a diagram for describing the pattern 1 of resource mapping according to the third embodiment.

FIG. 13 and FIG. 14 are diagrams for describing a pattern 1 of resource mapping according to the third embodiment. FIG. 13 illustrates the radio resource of one resource block in one subframe (an uplink subframe).

As shown in FIG. 13, in the pattern 1, the resource mapping unit 4 arranges the resource element to which an analog symbol is mapped adjacent to the resource element (an SRS resource) to which an SRS is mapped. The resource element (the SRS resource) to which the SRS is mapped corresponds to the first radio resource. The SRS resource is provided with leaving an interval of one subcarrier in the last symbol. The resource element to which the analog symbol is mapped corresponds to the second radio resource. The SRS is mapped to a resource element in the last symbol of the subframe, and therefore, the analog symbol is mapped to the resource element (hereinafter, the "eSRS") adjacent to the SRS resource in the second symbol from the end.

As shown in FIG. 14, in the eSRS, an analog symbol indicating one CSI element (a channel response value) is mapped to one resource element. The channel information (CSI) is represented by an array including a channel response value for each combination of the transmission antenna and the reception antenna. Therefore, one resource element is mapped to one element (channel response value) of the array, and one array is transmitted by a plurality of resource elements corresponding to the eSRS.

Figure 15:
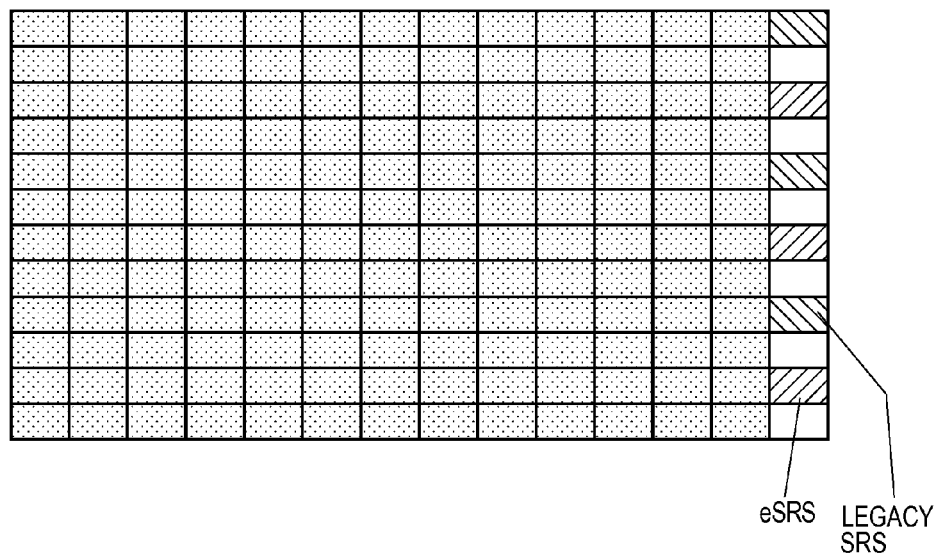
FIG. 15 is a diagram for describing a pattern 2 of resource mapping according to the third embodiment.

FIG. 15 is a diagram for describing a pattern 2 of resource mapping according to the third embodiment.

As shown in FIG. 15, in the pattern 2, the resource mapping unit 4 maps the analog symbol to the resource element corresponding to the last symbol. Specifically, an analog symbol is mapped to some of the resource elements, out of the resource elements corresponding to the SRS resource. The SRS is mapped with leaving an interval of three subcarriers in the last symbol. The analog symbol is mapped to the subcarrier (resource element) positioned in the center of the three subcarriers in the last symbol.

Further, the compound type of the patterns 1 and 2 can also be used.

Figure 16:
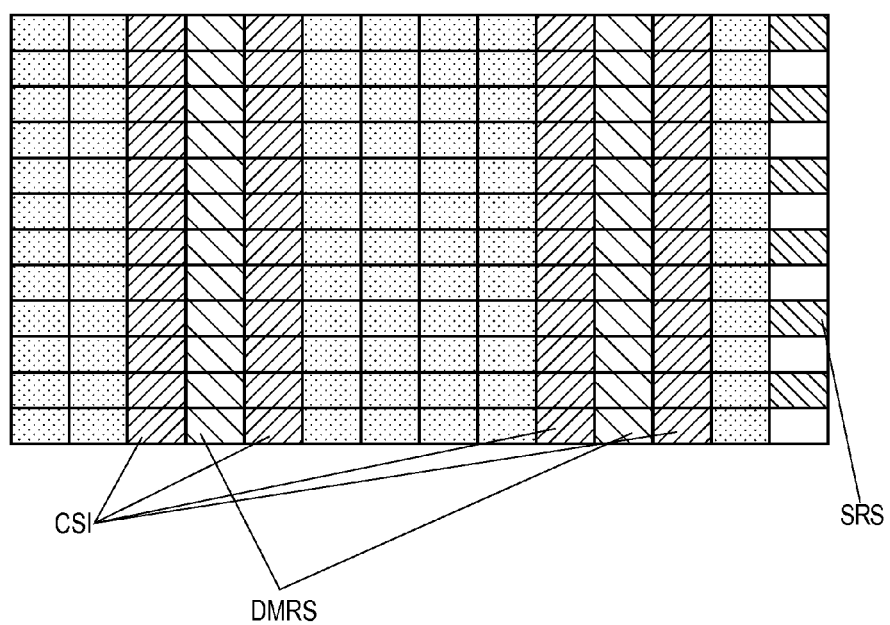
FIG. 16 is a diagram for describing a pattern 3 of resource mapping according to the third embodiment.

FIG. 16 is a diagram for describing a pattern 3 of resource mapping according to the third embodiment.

As shown in FIG. 16, in the pattern 3, the resource mapping unit 4 arranges the analog symbol adjacent to the resource element (a DMRS resource) to which the DMRS is mapped as a reference signal. In the example shown in FIG. 16, the DMRS resource is provided in the fourth symbol and the 11th symbol from the first. The analog symbol is mapped to the resource element corresponding to the third symbol, fifth symbol, 10th symbol, and 12th symbol from the first.

The resource element (the second radio resource) to which the analog symbol is mapped is preferably a resource element belonging to the PUSCH region rather than a resource element belonging to the PUCCH region. This is because in the PUCCH region, a plurality of UEs 100 use the same radio resource through code division multiplexing, but code division multiplexing cannot be applied to the analog symbol.

Further, in a reference signal resource (an SRS resource and DMRS resource), a plurality of UEs 100 use the same radio resource through code division multiplexing, but because code division multiplexing cannot be applied to the analog symbol, frequency division multiplexing or time division multiplexing is necessary in the analog symbol. That is, when the UE 100 and another UE perform transmission of an analog symbol, the resource mapping unit 4 of the UE 100 uses a resource element different from the resource element used in the transmission of the analog symbol by another UE in the transmission of the analog symbol.

Fourth Embodiment

Hereinafter, a fourth embodiment will be described on a difference from the first to third embodiments. The fourth embodiment is an embodiment concerning details of signal processing in the analog transmission scheme.

(Operation Pattern 1)

In an operation pattern 1 of the fourth embodiment, in the analog transmission scheme, the control unit 162 of the UE 100 notifies the eNB 200 of the range of values of the data to be transmitted or a magnification of the transmission signal for the data to be transmitted.

In the analog transmission scheme, in a case where the range of values (that is, the absolute value) of the data to be transmitted is not clearly known to the eNB 200, the eNB 200 cannot accurately grasp the value (the data to be transmitted) indicated by the received analog symbol. Further, in a case where the transmission signal is amplified with respect to the data to be transmitted and the magnification is not clearly known, the eNB 200 cannot accurately grasp the value (the data to be transmitted) indicated by the received analog symbol.

Therefore, in the operation pattern 1 of the fourth embodiment, the eNB 200 can accurately grasp the value (the data to be transmitted) indicated by the received analog symbol by notifying the eNB 200 of the range of values of the data to be transmitted or the magnification of the transmission signal for the data to be transmitted.

(Operation Pattern 2)

In an operation pattern 2 of the fourth embodiment, the data to be transmitted is each component contained in the channel response array. The channel response array is obtained by the above-described channel estimation and can be expressed as an m×n matrix. Here, "m" is the number of reception antennas of the UE 100, and "n" is the number of transmission antennas of the eNB 200.

In the operation pattern 2 of the fourth embodiment, in the analog transmission scheme, the signal processing unit 161 of the UE 100 normalizes the other components using a specific component contained in the channel response array so as to skip the transmission of the specific component. The specific component is a predetermined component in the channel response array (for example, the component at the 0th row and 0th column (h00)). Alternatively, the specific component may be a component having a maximum amplitude in the channel response array. In this case, the control unit 162 notifies the eNB 200 of information indicating the component having the maximum amplitude in the channel response array.

In the operation pattern 2 of the fourth embodiment, the information amount to be transmitted can be reduced by skipping the transmission of the specific component.

(Operation Pattern 3)

In an operation pattern 3 of the fourth embodiment, the data to be transmitted is each component contained in the channel response array. Each component contained in the channel response array contain amplitudes. In the analog transmission scheme, the signal processing unit 161 of the UE 100 performs the resource mapping such that the number of transmission symbols on which each component containing the amplitude is placed becomes substantially uniform in each interval of the symbol.

Specifically, the m×n components are disposed within an interval of one symbol as much as possible. Therefore, even when the channel state is changed in the time direction at the time of the transmission in the analog transmission scheme, the influence of the change can be kept small.

Further, the m×n components are averagely placed on a plurality of resource elements (a plurality of subcarriers) in the interval of one symbol as much as possible. In other words, the resource mapping is performed such that the m×n components are not intensively disposed some resource elements in the interval of one symbol. Therefore, even when the channel state is changed in the frequency direction at the time of the transmission in the analog transmission scheme, the influence of the change can be kept small.

However, in a case where the number of subcarriers is insufficient, it is difficult to dispose the m×n components in the interval of one symbol, so that the resource mapping is performed to divide the interval into a plurality of intervals of the symbol.

In the operation pattern 3 of the fourth embodiment, the data to be transmitted may be each component contained in a covariance matrix corresponding to the channel response array. Each component contained in the covariance matrix includes an amplitude. In the analog transmission scheme, the signal processing unit 161 performs the resource mapping such that the number of transmission symbols on which each component containing the amplitude is placed becomes substantially uniform in each interval of the symbol.

When the operation pattern 3 is applied, the control unit 162 notifies the eNB 200 of the content of the signal processing.

(Operation Pattern 4)

In an operation pattern 4 of the fourth embodiment, the data to be transmitted is each component contained in the covariance matrix (HHH) corresponding to the channel response array (H). In the analog transmission scheme, the signal processing unit 161 of the UE 100 performs special signal processing on the diagonal components contained in the covariance matrix. In the covariance matrix, the diagonal component is an important component, and the components other than the diagonal component are "0". Therefore, the diagonal components and the other components are differently processed.

In the special signal processing, the transmission symbol on which the diagonal component is placed is compared with other symbols and redundantly transmitted. The redundant transmission means, for example, that the resource mapping is performed to redundantly dispose the transmission symbol on which the diagonal component is placed. Further, only the diagonal component may be transmitted without transmitting the components other than the diagonal component.

Alternatively, in the special signal processing, a pair of diagonal components is mapped on one signal point on the IQ plane. Since the diagonal components are real numbers, complex mapping (IQ mapping) can be performed using two pairs by performing, for example, the modulation with respect to two independent axes on the IQ plane.

When the operation pattern 4 is applied, the control unit 162 of the UE 100 notifies the eNB 200 of the content of the signal processing.

(Operation Pattern 5)

In an operation pattern 5 of the fourth embodiment, the data to be transmitted is each component contained in the channel response array. Each component contained in the channel response array includes an I component and a Q component. In the analog transmission scheme, the signal processing unit 161 of the UE 100 places the I component and the Q component on the separated transmission symbols. Therefore, a transmission rate is reduced to the half (in other words, the number of symbols required for the transmission is doubled) compared to a case where the I component and the Q component are placed on one transmission symbol, but error resistance can be improved.

For example, in the first embodiment described above, the I component is placed on the transmission symbol while setting the phase to "0". Further, the Q component is placed on another transmission symbol while setting the phase to "0".

Further, in the second embodiment described above, the I component is placed on the transmission symbol while setting the phase of precoder to "0". Further, the Q component is placed on another transmission symbol while setting the phase of precoder to "0".

When the operation pattern 5 is applied, the control unit 162 of the UE 100 notifies the eNB 200 of the content of the signal processing.

Fifth Embodiment

Hereinafter, a fifth embodiment will be described on a difference from the first to fourth embodiments. The fifth embodiment is an embodiment concerning redundancy and error correction in the analog transmission scheme.

(Operation Pattern 1)

In an operation pattern 1 of the fifth embodiment, in the analog transmission scheme, the signal processing unit 161 of the UE 100 generates not only the transmission symbol carrying the data to be transmitted but only the transmission symbol carrying redundancy data corresponding to the data to be transmitted. The redundancy data is the same data as the data to be transmitted, or data different from the data to be transmitted, from which the data to be transmitted can be derived.

The data which is different from the data to be transmitted and from which the data to be transmitted can be derived is, for example, the following data.

Data inversely disposed with respect to a symbol point (a signal point on the IQ plane) of the data to be transmitted.

Data corresponding to "Maximum value−A" with respect to the data A to be transmitted.

Data obtained as a result of different calculation (for example, I×Q and I+Q) with respect to the data I and Q to be transmitted.

Data "It−(It−Δt), Qt−(Qt−Δt)" which is a difference between the data "It, Qt" to be transmitted and the previous data "(It−Δt), (Qt−Δt)" to be transmitted.

When the operation pattern 1 is applied, the control unit 162 of the UE 100 notifies the eNB 200 of the content of the signal processing.

The eNB 200 receiving the redundancy data confirms the validity of the demodulated data to be transmitted on the basis of the redundancy data, and may perform correction as needed.

(Operation Pattern 2)

In an operation pattern 2 of the fifth embodiment, the control unit 162 of the UE 100 generates an error detection code corresponding to the data to be transmitted in the analog transmission scheme, and notifies the eNB 200 of the error detection code. Further, the "error detection code" means a code which can be used not only for the error detection but also for the error correction. The control unit 162 of the UE 100 directly maps the data to be transmitted to the signal point on the IQ plane, derives the bit stream corresponding to the directly mapped signal point on the basis of the association between the signal point and the bit stream in the digital transmission scheme, and generates the error detection code from the derived bit stream.

Figure 17:
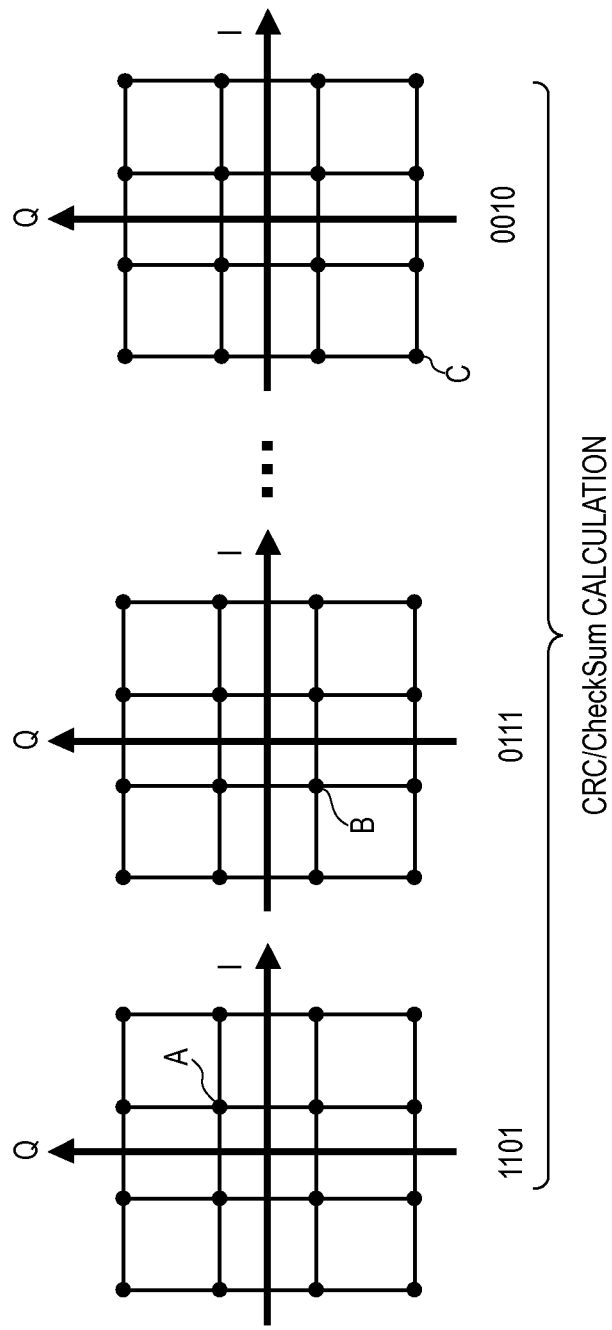
FIG. 17 is a diagram for describing an operation pattern 2 of the fifth embodiment.

FIG. 17 is a diagram for describing the operation pattern 2 of the fifth embodiment. As illustrated in FIG. 17, in a case where the data to be transmitted is directly mapped to the signal point on the IQ plane, the control unit 162 of the UE 100 determines whether the subject signal point corresponds to a signal point in the digital transmission scheme. In the example of FIG. 17, 16 QAM is assumed as the digital transmission scheme. For example, in a case where the data to be transmitted in FIG. 17 is directly mapped to the signal point A on the IQ plane, the signal point A corresponds to a bit stream "1101" in 16 QAM. Therefore, CheckSum or CRC obtained from "1101" is generated as the error detection code.

When the operation pattern 2 is applied, the control unit 162 of the UE 100 notifies the eNB 200 of a method of generating the error detection code.

The eNB 200 receiving the error detection code confirms the validity of the modulated data to be transmitted on the basis of the error detection code, and may perform correction as needed.

(Operation Pattern 3)

In an operation pattern 3 of the fifth embodiment, the control unit 162 of the UE 100 divides the IQ plane into a plurality of regions for management. In the analog transmission scheme, the signal processing unit 161 of the UE 100 generates the transmission symbol by directly mapping the data to be transmitted to the signal point on the IQ plane. The control unit 162 of the UE 100 notifies the eNB 200 of a region identifier (serving as the error detection code) indicating a region to which the signal point belongs among the plurality of regions on the IQ plane. In a case where the region is created for each group containing a plurality of signal points, the region identifier may be a group identifier.

When the operation pattern 3 is applied, the control unit 162 notifies the eNB 200 of the respective positions and ranges in the plurality of regions on the IQ plane.

The eNB 200 receiving the error detection code confirms the validity of the modulated data to be transmitted on the basis of the error detection code, and may perform correction as needed.

(Operation Pattern 4)

In an operation pattern 4 of the fifth embodiment, when the data to be transmitted is converted into the transmission symbol in the analog transmission scheme, the signal processing unit 161 of the UE 100 sets a reference value on the I axis and a reference value on the Q axis to be larger than the origin such that the transmission symbol is not mapped in the vicinity of the origin on the IQ plane. Therefore, the analog symbol can be prevented from being buried in white noises at the time of the transmission.

Figure 18:
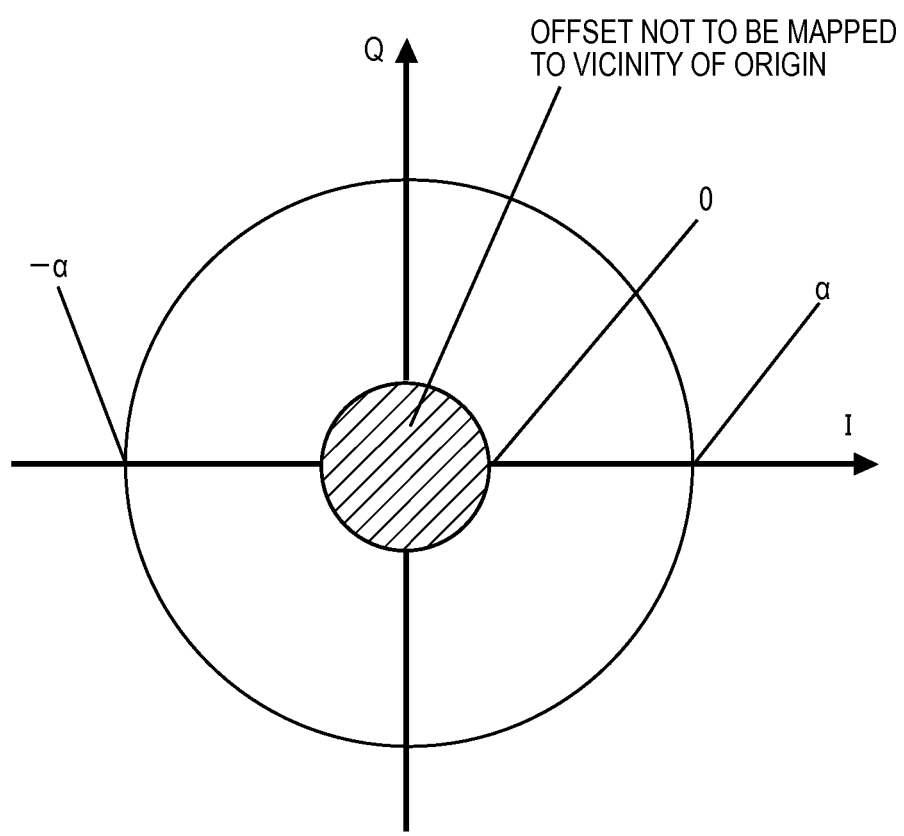
FIG. 18 is a diagram for describing an operation pattern 4 of the fifth embodiment.

FIG. 18 is a diagram for describing the operation pattern 4 of the fifth embodiment. As illustrated in FIG. 18, the vicinity of the origin of the IQ plane is set as a forbidden region, and added with an offset for performing the IQ symbol mapping in the region other than the forbidden region.

When the operation pattern 4 is applied, the control unit 162 notifies the eNB 200 of the offset information.

(Operation Pattern 5)

In an operation pattern 5 of the fifth embodiment, the control unit 162 of the UE 100 divides the range of values of the data to be transmitted into a plurality of numerical ranges for management. In the analog transmission scheme, the control unit 162 of the UE 100 notifies the eNB 200 of a range identifier indicating a target numerical range to which the data to be transmitted belongs among the plurality of numerical ranges. In the analog transmission scheme, the signal processing unit 161 of the UE 100 transmits the data to be transmitted which is converted in accordance with a magnification rate of the entire range (a range where the actual transmission is performed) where the transmission is allowed with respect to the target numerical range.

For example, the control unit 162 divides the range of values of the data to be transmitted into N ranges (for example, 4 divisions) to define NN numerical ranges, and notifies of a value indicating the numerical range to which the data to be transmitted belongs. The signal processing unit 161 transmits a value matched with the range where the value in the numerical range is actually transmitted (that is, "(Transmitting value−Reference value in the range)×Standard value").

When the operation pattern 5 is applied, the control unit 162 notifies the eNB 200 of the information related to the numerical range.

According to the operation pattern 5 of the fifth embodiment, a higher resolution value can be transmitted by the analog transmission scheme.

Sixth Embodiment

Hereinafter, a sixth embodiment will be described on a difference from the first to fifth embodiments. In the first to fifth embodiments described above, in the configuration where the analog transmission scheme is applied to the CSI feedback, the description has been mainly made about the radio communication device (that is, the UE 100) on the transmission side. In the sixth embodiment, the description will be mainly made about the radio communication device (that is, the eNB 200) on the reception side.

Figure 19:
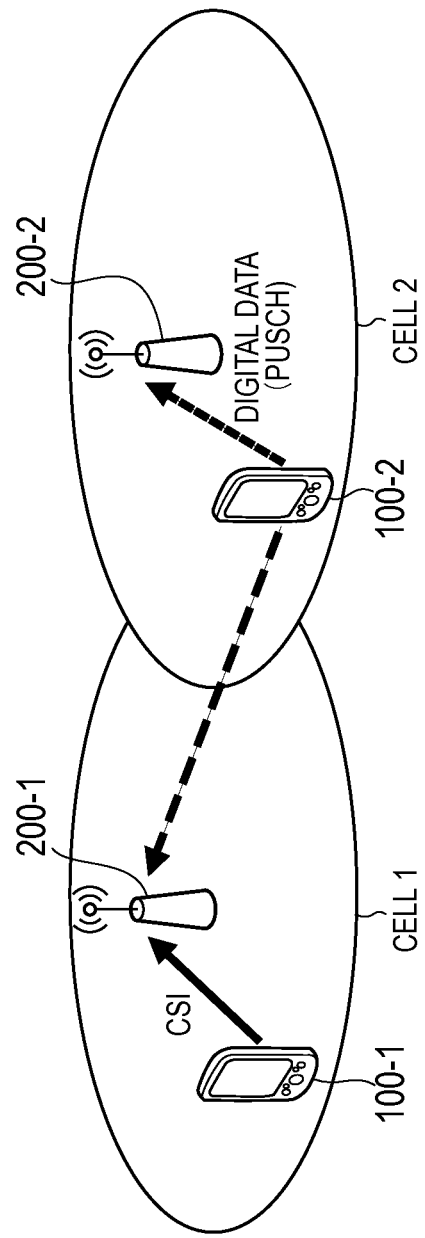
FIG. 19 is a diagram illustrating an operating environment according to the sixth embodiment.

FIG. 19 is a diagram illustrating an operating environment according to the sixth embodiment.

As illustrated in FIG. 19, a UE 100-1 is in the connected state in a cell 1 managed by an eNB 200-1. The UE 100-1 transmits the CSI to the eNB 200-1 by the analog transmission scheme, and transmits user data to the eNB 200-1 on the PUSCH by the digital transmission scheme. At that time, the UE 100-1 maps the transmission signal generated by the analog transmission scheme to a radio resource (resource element) designated from the eNB 200-1.

Further, a UE 100-2 is in the connected state in a cell 2 managed by an eNB 200-2. The UE 100-2 transmits the CSI to the eNB 200-2 by the analog transmission scheme, and transmits the user data to the eNB 200-2 on the PUSCH by the digital transmission scheme. At the time, the UE 100-2 maps the transmission signal generated by the analog transmission scheme to the radio resource (resource element) designated from the eNB 200-2.

The cell 2 corresponds to a cell adjacent to the cell 1, and the cell 1 corresponds to a cell adjacent to the cell 2. Therefore, the transmission signal of the UE 100-2 can be received not only as a desired waveform signal in the eNB 200-2, but also as an interference wave signal in the eNB 200-1. Similarly, the transmission signal of the UE 100-1 can be received not only as the desired waveform signal in the eNB 200-1, but also as the interference wave signal in the eNB 200-2.

Hereinafter, an interference countermeasure operation in a case where the eNB 200-1 receives the transmission signal of the UE 100-2 as the interference wave signal will be mainly described. As described above, since an error is easily carried in the CSI transmitted from the UE 100-1 by the analog transmission scheme at the time of the transmission, the interference countermeasure for the CSI transmission is strongly required.

(Operation Pattern 1)

The reception unit 212 of the eNB 200-1 receives a first transmission signal transmitted from the UE 100-1, and receives a second transmission signal transmitted from the UE 100-2. The control unit 242 of the eNB 200-1 notifies the UE 100-1 of at least any one of information indicating a first resource element mapped to the first transmission signal (CSI) generated by the analog transmission scheme and information indicating a second resource element mapped to the second transmission signal (CSI) generated by the analog transmission scheme. The eNB 200-1 may acquire the information indicating the second resource element from the eNB 200-2, or may have the information stored in advance.

In an operation pattern 1, the first resource element and the second resource element are set not to be overlapped in at least one of the frequency direction and the time direction. Therefore, it is possible to prevent the interference between the CSI transmitted by the analog transmission scheme from the UE 100-1 and the CSI transmitted by the analog transmission scheme from the UE 100-2.

The control unit 242 of the eNB 200-1 notifies the UE 100-1 of control information for making the UE 100-1 reduce the interference onto the second resource element. The control information includes, for example, identification information of the second resource element or identification information of a symbol corresponding to the second resource element. The UE 100-1 may be notified of the control information by a unicast manner or a broadcast manner. The UE 100-1 receiving the control information does not map the first transmission signal to the second resource element or sets transmission power in the second resource element to zero. Alternatively, the UE 100-1 receiving the control information does not map the first transmission signal to a symbol corresponding to the second resource element or sets the transmission power in a symbol corresponding to the second resource element to zero. Alternatively, the method of reducing the transmission power is not limited to the case where the second resource element is set as blank as described above, and the transmission power may be reduced after the PUSCH is mapped. For example, the control unit 242 of the eNB 200-1 explicitly notifies the UE 100-1 of information indicating a falling degree (xx dB) of the transmission power compared to another PUSCH resource (other than a portion corresponding to the second resource element). Alternatively, the falling degree may be predefined in a specification. In this case, for example, a predefinition such as 3 dB falling at minimum may be considered.

In addition, the control unit 242 of the eNB 200-2 notifies the UE 100-2 of the control information for reducing the interference on the first resource element by the UE 100-2. The control information includes, for example, identification information of the first resource element or identification information of a symbol corresponding to the first resource element. The UE 100-2 may be notified of the control information by the unicast manner or the broadcasting manner. The UE 100-2 receiving the control information does not map the second transmission signal to the first resource element or sets the transmission power in the first resource element to zero. Alternatively, the UE 100-2 receiving the control information does not map the second transmission signal to a symbol corresponding to the first resource element or sets the transmission power in the symbol corresponding to the first resource element to zero. Alternatively, similarly to the above description, the method is not limited to the case where the first resource element is set as blank, and the transmission power may be reduced after the PUSCH is mapped.

Figure 20:
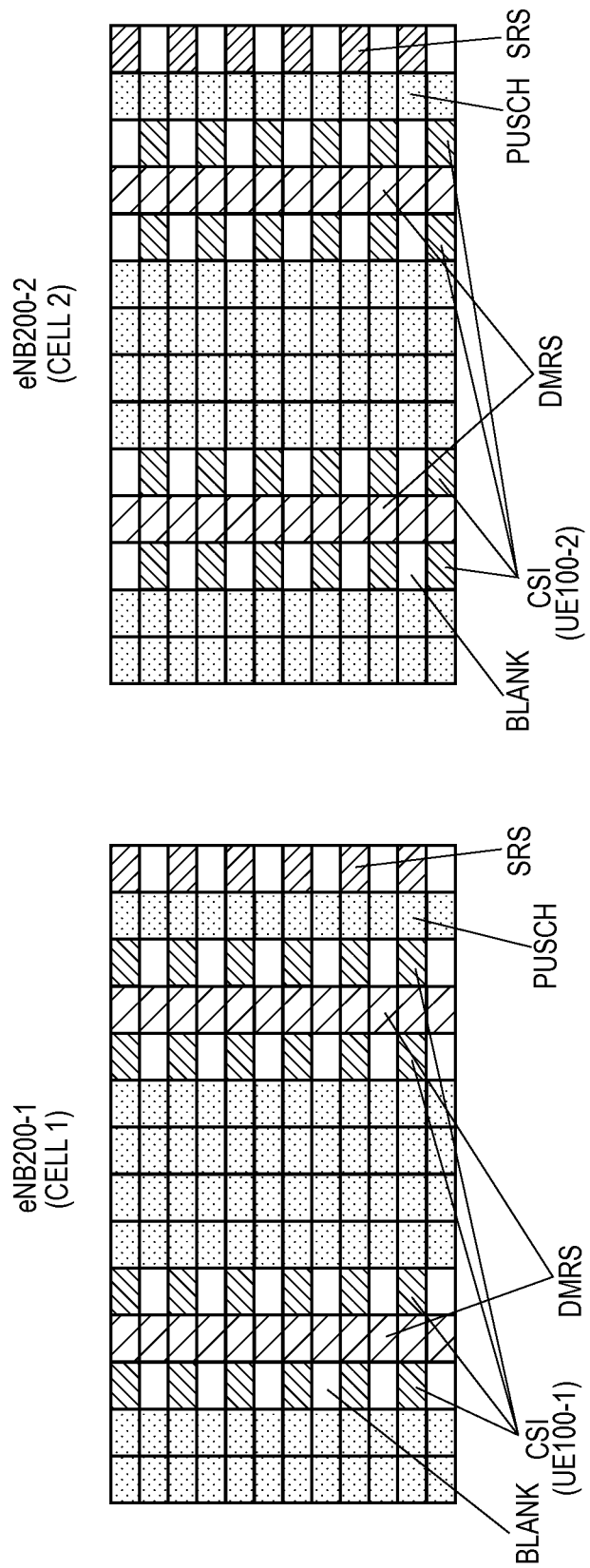
FIG. 20 is a diagram illustrating a first application of the radio resource in the operation pattern 1 of the sixth embodiment.

FIG. 20 is a diagram illustrating a first application of the radio resource in the operation pattern 1. In FIG. 20, the radio resource of one resource block processed in the uplink by the eNB 200-1 and the radio resource of one resource block processed in the uplink by the eNB 200-2 are illustrated.

As illustrated in FIG. 20, the CSIs of the UE 100-1 are mapped to the resource elements (the first resource elements) including odd subcarriers corresponding to the third, fifth, tenth, and twelfth symbols from the first. The CSIs of the UE 100-2 are mapped to the resource elements (the second resource elements) including even subcarriers corresponding to the third, fifth, tenth, and twelfth symbols from the first.

The UE 100-2 sets the first resource element as blank. In other words, the transmission signal is not mapped to the first resource element, or the transmission power in the first resource element is set to zero. Therefore, the CSI of the UE 100-1 is transmitted to the eNB 200-1 without the interference from the transmission signal of the UE 100-2.

Further, the UE 100-1 sets the second resource element as blank. In other words, the transmission signal is not mapped to the second resource element, or the transmission power in the second resource element is set to zero. Therefore, the CSI of the UE 100-2 is transmitted to the eNB 200-2 without the interference from the transmission signal of the UE 100-1.

Figure 21:
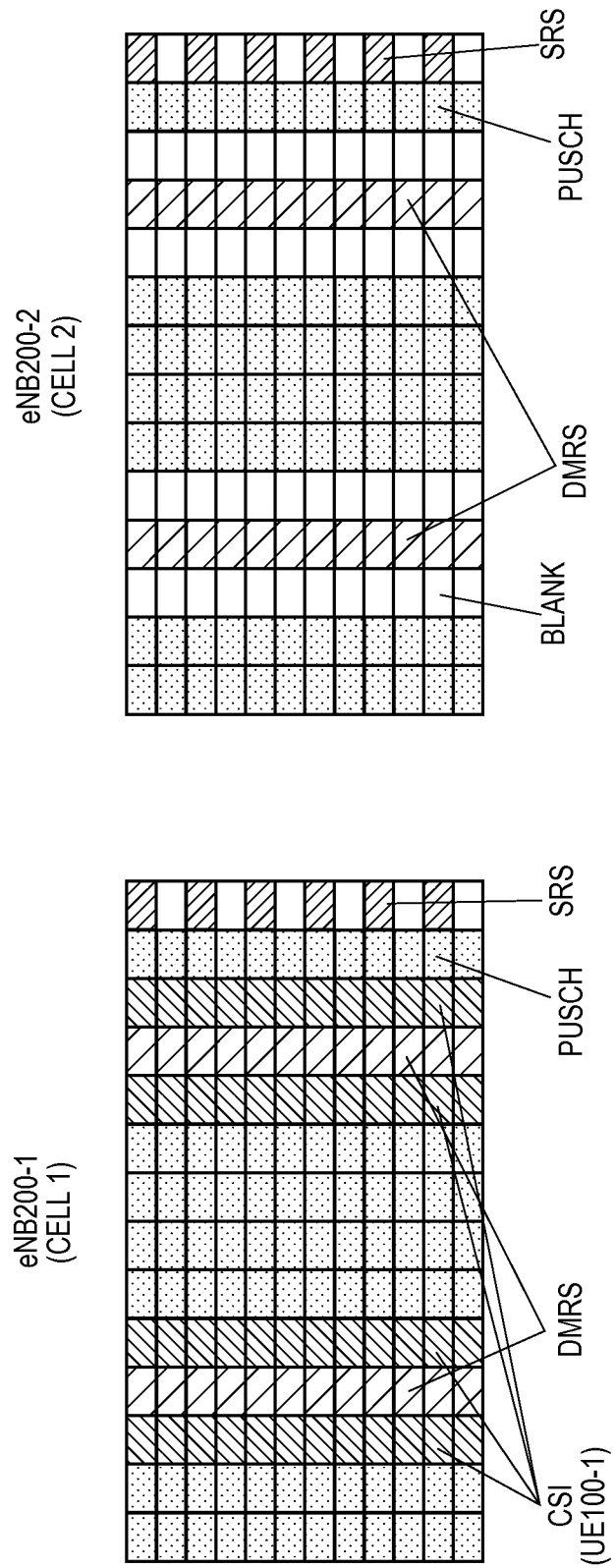
FIG. 21 is a diagram illustrating a second application of the radio resource in the operation pattern 1 of the sixth embodiment.

FIG. 21 is a diagram illustrating a second application of the radio resource in the operation pattern 1. Herein, the description will be mainly made about a difference on the first application of the radio resource.

As illustrated in FIG. 21, the CSIs of the UE 100-1 are mapped to the resource elements (the first resource elements) including all the subcarriers corresponding to the third, fifth, tenth, and twelfth symbols from the first.

The UE 100-2 sets the first resource element as blank. In other words, the transmission signal is not mapped to the first resource element, or the transmission power in the first resource element is set to zero. Therefore, the CSI of the UE 100-1 is transmitted to the eNB 200-1 without the interference from the transmission signal of the UE 100-2.

(Operation Pattern 2)

In an operation pattern 2, the second transmission signal (the PUSCH of the UE 100-2) generated by the digital transmission scheme is mapped to the first resource element.

Figure 22:
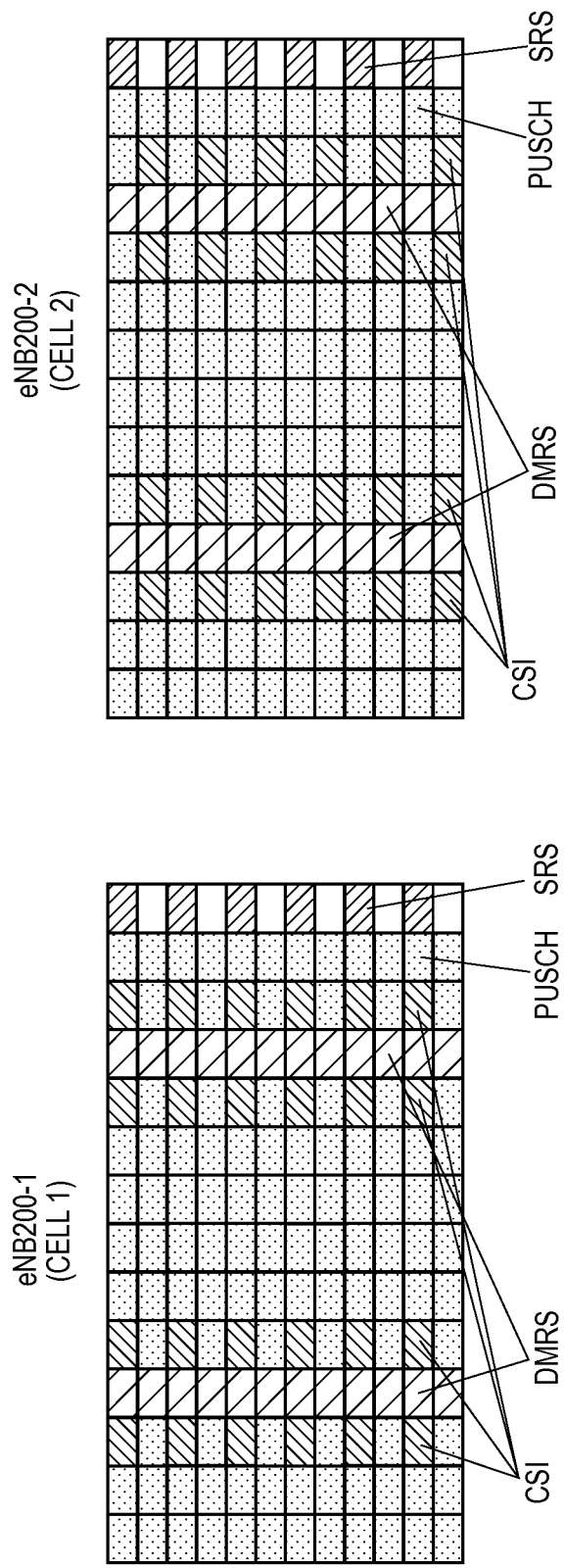
FIG. 22 is a diagram illustrating a first application of the radio resource in the operation pattern 2 of the sixth embodiment.

FIG. 22 is a diagram illustrating a first application of the radio resource in the operation pattern 2. In FIG. 22, the radio resource of one resource block processed in the uplink by the eNB 200-1 and the radio resource of one resource block processed in the uplink by the eNB 200-2 are illustrated.

As illustrated in FIG. 22, the CSIs of the UE 100-1 are mapped to the resource elements (the first resource elements) including odd subcarriers corresponding to the third, fifth, tenth, and twelfth symbols from the first. The CSIs of the UE 100-2 are mapped to the resource elements (the second resource elements) including even subcarriers corresponding to the third, fifth, tenth, and twelfth symbols from the first.

The UE 100-2 does not set the first resource element as blank, and maps the digital data PUSCH to the first resource element. Further, the UE 100-1 does not set the second resource element as blank, and maps the digital data PUSCH to the second resource element.

Figure 23:
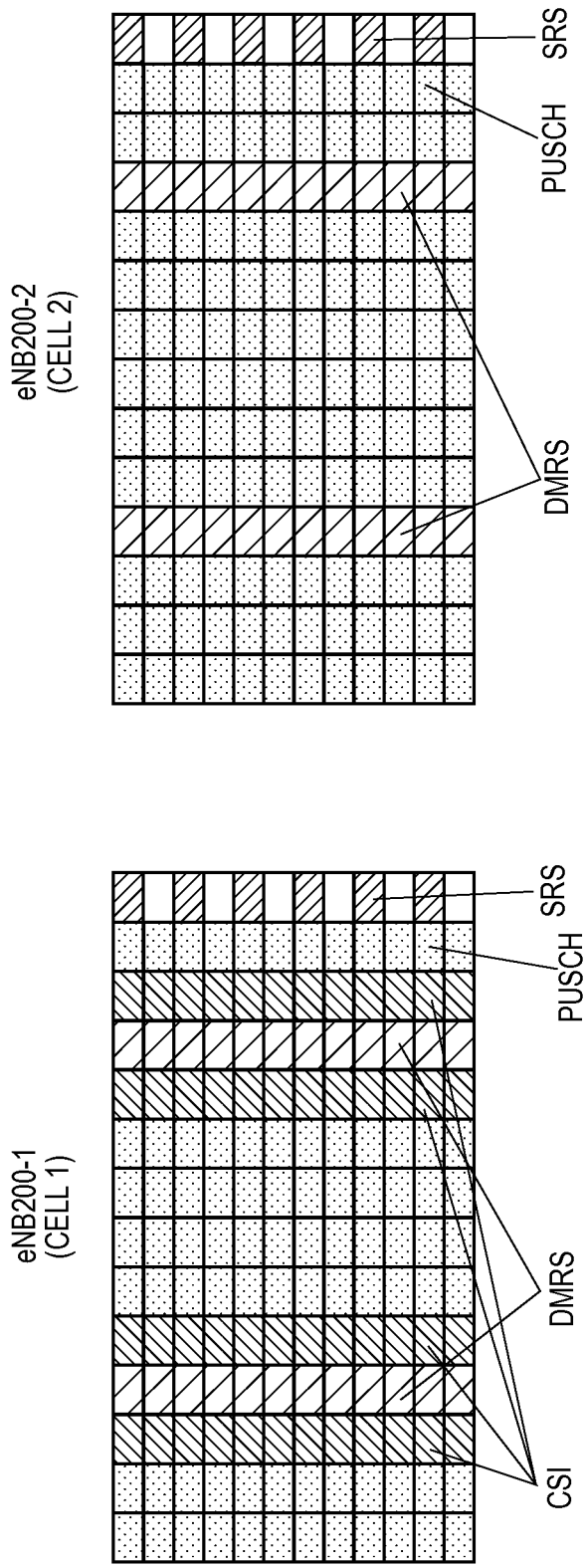
FIG. 23 is a diagram illustrating a second application of the radio resource in the operation pattern 2 of the sixth embodiment.

FIG. 23 is a diagram illustrating a second application of the radio resource in the operation pattern 2. Herein, the description will be mainly made about a difference on the first application of the radio resource.

As illustrated in FIG. 23, the CSIs of the UE 100-1 are mapped to the resource elements (the first resource elements) including all the subcarriers corresponding to the third, fifth, tenth, and twelfth symbols from the first.

The UE 100-2 does not set the first resource element as blank, and maps the digital data PUSCH to the first resource element.

In this way, in the operation pattern 2, the second transmission signal (the PUSCH of the UE 100-2) generated by the digital transmission scheme is mapped to the first resource element. In this case, the first transmission signal (the CSI of the UE 100-1) mapped to the first resource element receives the interference from the second transmission signal.

In the operation pattern 2, the signal processing unit 241 of the eNB 200-1 performs an interference canceling process on a composite signal of the first transmission signal and the second transmission signal in the first resource element. The interference canceling process includes a process of generating a replica of the second transmission signal in the first resource element and a process of subtracting the replica from the composite signal. Such an interference canceling process is called an SIC (Successive Interference Canceller).

The control unit 242 of the eNB 200-1 acquires a transmission signal parameter applied to the second transmission signal generated by the digital transmission scheme from the eNB 200-2. The transmission signal parameter includes, for example, at least one of the number of transmission antennas, a modulation and coding scheme (MCS), a redundancy version (RV), a transmission mode, the number of layers, a transmission precoder matrix index (TPMI), a resource block, information indicating a demodulation reference signal (DMRS) sequence, setting information of a sounding reference signal (SRS), and a power difference between the DMRS and the physical uplink shared channel (PUSCH). The control unit 242 of the eNB 200-1 notifies the eNB 200-2 of the resource block and the subframe including the first resource element in order to acquire the transmission signal parameter.

The signal processing unit 241 of the eNB 200-1 performs a process of demodulating the data contained in the second transmission signal in the first resource element and a process of generating the replica from the demodulated data on the basis of the transmission signal parameter. Then, the signal processing unit 241 of the eNB 200-1 performs a process of subtracting the replica from the composite signal of the first transmission signal and the second transmission signal. Therefore, even when the CSI of the UE 100-1 receives the interference from the transmission signal of the UE 100-2, the interference can be cancelled by the interference canceling process.

Figure 24:
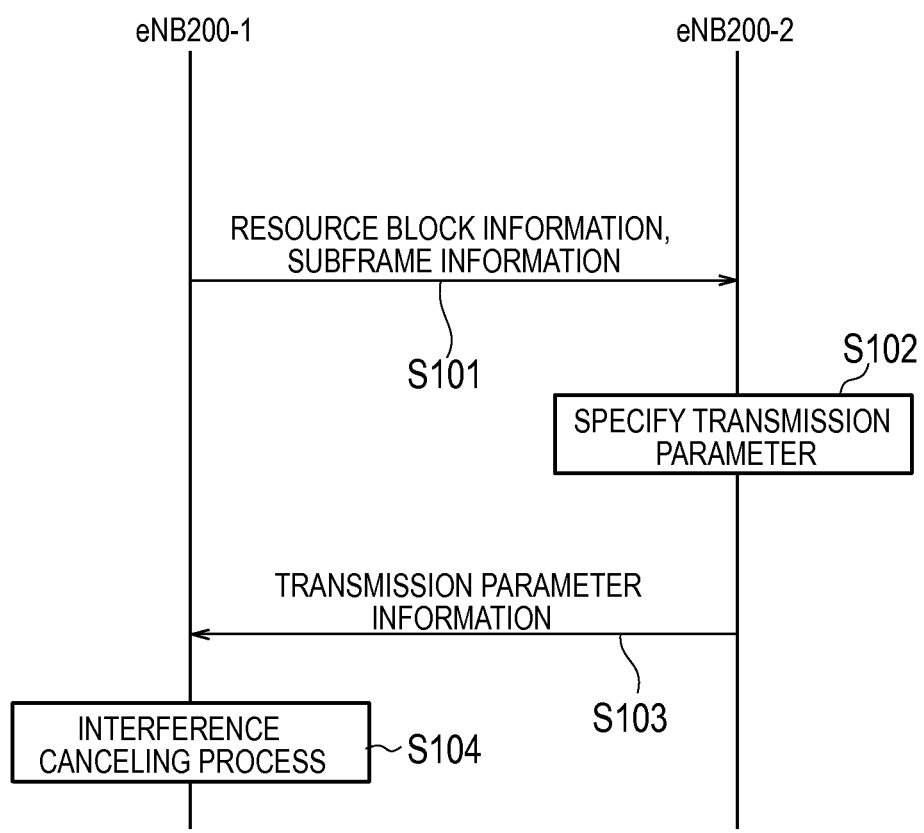
FIG. 24 is a sequence diagram illustrating the operation pattern 2 of the sixth embodiment.

FIG. 24 is a sequence diagram illustrating the operation pattern 2.

As illustrated in FIG. 24, in Step S101, the eNB 200-1 notifies the eNB 200-2 of the resource block and the subframe including the first resource element. The notification is performed, for example, on the X2 interface.

In Step S102, the eNB 200-2 specifies the transmission signal parameter applied to the second transmission signal generated by the digital transmission scheme in the resource block and the subframe on the basis of the resource block and the subframe of which the eNB 200-1 informed the eNB 200-2. In a case where a range (hereinafter, referred to as "application resource range") of the radio resource applied with the transmission signal parameter is wider than a range of the radio resource including the resource block and the subframe, the eNB 200-2 specifies the transmission signal parameter in the application resource range including the notified resource block and the notified subframe. As described above, the transmission signal parameter includes, for example, at least one of the number of transmission antennas, the MCS, the redundancy version, the transmission mode, the number of layers, the TPMI, the resource block, the information indicating the DMRS sequence, and the setting information of the SRS. These parameters are used to demodulate the second transmission signal (interference wave signal) in the eNB 200-1. The transmission signal parameter may further include the power difference between the DMRS and the PUSCH. The parameter is used to convert the demodulated data into the symbol information with high accuracy.

In Step S103, the eNB 200-2 notifies the eNB 200-1 of the transmission signal parameter specified in Step S102. The notification is performed, for example, on the X2 interface.

In Step S104, the eNB 200-1 performs the interference canceling process on the basis of the notified transmission signal parameter. As described above, the eNB 200-1 demodulates the data contained in the second transmission signal in the first resource element on the basis of the transmission signal parameter, generates the replica from the demodulated data, and subtracts the replica from the composite signal of the first transmission signal and the second transmission signal.

Modification of Sixth Embodiment

In the sixth embodiment described above, the interference countermeasure operation in the eNB 200-1 has been described. However, the same interference countermeasure operation may be performed on the eNB 200-2. In this case, in the sixth embodiment described above, the eNB 200-1 is replaced with the eNB 200-2, and the UE 100-1 is replaced with the UE 100-2.

Further, in the sixth embodiment described above, the interference countermeasure operation between the cells has been described. However, the interference countermeasure operation may be applied even to the interference (at the time of MU-MIMO) between the users in the cell. For example, in a case where both of the UE 100-1 and the UE 100-2 are connected to the eNB 200-1 and the MU-MIMO is applied to the UE 100-1 and the UE 100-2, the interference countermeasure operation is applied. In this case, there is no need to exchange auxiliary information between the eNBs 200.

Other Embodiments

In each of the above embodiments, the trigger for the CSI feedback is not particularly described; however, CSI transmission triggers may include: 1) when an uplink assignment occurs, 2) when an uplink assignment occurs, and on the basis of the upper-level settings, 3) when an uplink assignment occurs, then on the basis of the trigger bit of the DCI, and 4) periodically on the basis of the upper-level settings. The upper-level settings imply the settings in the RRC.

In each of the above embodiments, the transmission mode of the analog symbol is not particularly dealt with, but transmission diversity may be applied as the transmission mode of the analog symbol. Transmission diversity, for example, includes STBC, SFBC, FSTD, and the like. Alternatively, spatial multiplexing and beam forming may be applied as the transmission modes of the analog symbol. Spatial multiplexing and beam forming include closed loop or open loop MIMO transmission and the like.

In each of the above embodiments, the data to be transmitted could be quantized in the analog transmission scheme. The quantization may be 1) varied in accordance with the UE transmitter accuracy, or 2) varied in accordance with the SN.

In each of the above embodiments, an example of applying the analog transmission scheme to the CSI feedback is explained; however, the analog transmission scheme may be applied to the data to be transmitted, other than CSI. For example, the analog transmission scheme may be applied to the data sensed in the UE 100 (such as the ambient air temperature, air pressure, humidity, and amount of pollen, and the like).

Moreover, in each of the above embodiments, an example of applying the analog transmission scheme to an uplink is explained; however, the analog transmission scheme may be applied to a downlink as well. When the analog transmission scheme is applied to the downlink, the eNB 200 corresponds to the radio communication device (a transmission side) according to the present invention, and the UE 100 corresponds to the radio communication device (a reception side).

In addition, in each of the above embodiments, description proceeds mainly with a case where the present disclosure is applied to an LTE system; however, the present disclosure may also be applied to a system other than the LTE system.

CROSS REFERENCE

In addition, the entire content of U.S. Provisional Application No. 61/806,280 (filed on Mar. 28, 2013) and Japanese Patent application No. 2013-224772 (filed on Oct. 29, 2013) is incorporated in the present specification by reference.

INDUSTRIAL APPLICABILITY

The present disclosure is useful for a mobile communication field.

The invention claimed is:

1. A radio communication apparatus comprising:
a processor that generates a transmission signal on the basis of data to be transmitted, the processor generating the transmission signal by a transmission scheme selected from a digital transmission scheme and an analog transmission scheme, and
a transceiver that transmits the transmission signal according to the selected transmission scheme, wherein
the digital transmission scheme is a transmission scheme by which a bit stream obtained through binary encoding of the data to be transmitted is converted into the transmission signal, and
the analog transmission scheme is a transmission scheme by which the data to be transmitted directly is converted into the transmission signal without performing binary encoding of the data to be transmitted, and wherein
in response to the processor selecting the analog transmission scheme, the transmitted data includes channel information obtained through channel estimation of reference signals received by the radio communication apparatus, the channel information including each component contained in a channel response matrix or each component contained in a covariance matrix corresponding to a channel response matrix.

2. The radio communication apparatus according to claim 1, wherein
the data to be transmitted consists of an analog value, or a value obtained by quantizing the analog value.

3. The radio communication apparatus according to claim 1, wherein
the processor selects a transmission scheme applied to the data to be transmitted, from the digital transmission scheme and the analog transmission scheme, on the basis of an attribute of the data to be transmitted.

4. The radio communication apparatus according to claim 3, wherein
the processor selects the analog transmission scheme as the transmission scheme to be applied to the data to be transmitted for which the inclusion of an error is permitted at a time of transmission.

5. The radio communication apparatus according to claim 3, wherein
the processor selects the analog transmission scheme as the transmission scheme applied to the data to be transmitted that consists of channel information obtained through channel estimation in the radio communication apparatus.

6. A radio communication apparatus comprising a processor configured to generate a transmission signal on the basis of data to be transmitted, wherein
the processor generates the transmission signal by a transmission scheme selected from a digital transmission scheme and an analog transmission scheme,
the digital transmission scheme is a transmission scheme by which a bit stream obtained through binary encoding of the data to be transmitted is converted into the transmission signal, the analog transmission scheme is a transmission scheme by which the data to be transmitted directly is converted into the transmission signal without performing binary encoding of the data to be transmitted, and
in the analog transmission scheme, the processor performs direct symbol mapping for converting the data to be transmitted into a transmission symbol.

7. The radio communication apparatus according to claim 6, wherein
in the symbol mapping, the processor converts the data to be transmitted into a transmission symbol by performing amplitude modulation-phase modulation, or modulation with respect to two independent axes on an IQ plane.

8. The radio communication apparatus according to claim 7, wherein
in the analog transmission scheme, the processor further performs resource mapping to map a reference signal to a first radio resource, and to map the transmission symbol to a second radio resource, and
in the resource mapping, the processor arranges the second radio resource in the vicinity of the first radio resource.

9. The radio communication apparatus according to claim 1, wherein
in the analog transmission scheme, the processor performs:
symbol mapping to convert reference data into a transmission symbol, and
precoding to generate the transmission signal by applying the data to be transmitted to the transmission symbol.

10. The radio communication apparatus according to claim 9, wherein
in the analog transmission scheme, the processor further performs resource mapping to map a reference signal to a first radio resource, and to map the transmission symbol to which the data to be transmitted has been applied to a second radio resource, and
in the resource mapping, the processor arranges the second radio resource in the vicinity of the first radio resource.

11. The radio communication apparatus according to claim 1, wherein
the processor notifies, of a communication partner apparatus in the analog transmission scheme, a range of values of the data to be transmitted or a magnification of the transmission signal with respect to the data to be transmitted.

12. The radio communication apparatus according to claim 1, wherein
the data to be transmitted is each component contained in a channel response matrix, and
in the analog transmission scheme, the processor normalizes other components by a specific component contained in the channel response matrix so as to skip the transmission of the specific component.

13. The radio communication apparatus according to claim 1, wherein
the data to be transmitted is each component contained in a channel response matrix,
each component contained in the channel response matrix includes an amplitude, and
in the analog transmission scheme, the processor performs resource mapping such that the number of transmission symbols on which each component containing the amplitude is placed becomes substantially uniform in each interval of the symbol.

14. The radio communication apparatus according to claim 1, wherein
the data to be transmitted is each component contained in a covariance matrix corresponding to a channel response matrix,
each component contained in the covariance matrix includes an amplitude, and
in the analog transmission scheme, the processor performs resource mapping such that the number of transmission symbols on which each component containing the amplitude is placed becomes substantially uniform in each interval of the symbol.

15. The radio communication apparatus according to claim 1, wherein
the data to be transmitted is each component contained in a covariance matrix corresponding to a channel response matrix,
in the analog transmission scheme, the processor performs special signal processing on a diagonal component contained in the covariance matrix, and
the special signal processing is at least one of a process in which a transmission symbol on which the diagonal component is placed is compared with other symbols and redundantly transmitted and a process in which a pair of diagonal components is mapped on one signal point on an IQ plane.

16. The radio communication apparatus according to claim 1, wherein
the data to be transmitted is each component contained in a channel response matrix, and
each component contained in the channel response matrix includes an I component and a Q component, and
in the analog transmission scheme, the processor places the I component and the Q component on separated transmission symbols.

17. The radio communication apparatus according to claim 1, wherein
in the analog transmission scheme, the processor generates not only a transmission symbol carrying the data to be transmitted but also a transmission symbol carrying redundancy data corresponding to the data to be transmitted, and
the redundancy data is the same data as the data to be transmitted or data different from the data to be transmitted, from which the data to be transmitted is derived.

18. The radio communication apparatus according to claim 1, wherein
the processor generates an error detection code corresponding to the data to be transmitted in the analog transmission scheme, and notifies a communication partner device of the error detection code, wherein
the processor is configured to
directly map the data to be transmitted to a signal point on an IQ plane,
derive a bit stream corresponding to the directly mapped signal point on the basis of correspondence between the signal point and the bit stream in the digital transmission scheme, and
generate the error detection code from the derived bit stream.

19. The radio communication apparatus according to claim 1, wherein
the processor divides an IQ plane into a plurality of regions for management, wherein
in the analog transmission scheme, the processor directly maps the data to be transmitted to a signal point on an IQ plane so as to generate the transmission symbol, and
the processor notifies a communication partner device of a region identifier as an error detection code indicating a region to which the signal point belongs among the plurality of regions.

20. The radio communication apparatus according to claim 1, wherein
in the analog transmission scheme, when the data to be transmitted is converted into a transmission symbol, the processor sets a reference value on an I axis and a reference value on a Q axis to be larger than the origin such that the transmission symbol is not mapped to the vicinity of the origin on an IQ plane.

21. The radio communication apparatus according to claim 1, wherein
the processor divides a range of values of the data to be transmitted into a plurality of numerical ranges for management, wherein
in the analog transmission scheme, the processor notifies a communication partner device of a range identifier indicating a target numerical range to which the data to be transmitted belongs among the plurality of numerical ranges, and
in the analog transmission scheme, the processor transmits the data to be transmitted which is converted in accordance with a magnification rate of the entire range where the transmission is allowed with respect to the target numerical range.

22. A radio communication apparatus, comprising:
a processor configured to receive a transmission signal generated on the basis of data to be transmitted, wherein
the transmission signal is generated by a transmission scheme selected from a digital transmission scheme and an analog transmission scheme,
the digital transmission scheme is a transmission scheme by which a bit stream obtained through binary encoding of the data to be transmitted is converted into the transmission signal,
the analog transmission scheme is a transmission scheme by which the data to be transmitted directly is converted into the transmission signal without performing binary encoding of the data to be transmitted, and
in response to the analog transmission scheme being selecting, the transmitted data includes channel information obtained through channel estimation of reference signals received by the radio communication apparatus, the channel information including each component contained in a channel response matrix or each component contained in a covariance matrix corresponding to a channel response matrix.

23. A radio communication apparatus configured to receive a transmission signal generated on the basis of data to be transmitted, wherein
the transmission signal is generated by a transmission scheme selected from a digital transmission scheme and an analog transmission scheme,
the digital transmission scheme is a transmission scheme by which a bit stream obtained through binary encoding of the data to be transmitted is converted into the transmission signal, and
the analog transmission scheme is a transmission scheme by which the data to be transmitted directly is converted into the transmission signal without performing binary encoding of the data to be transmitted, the radio communication apparatus further comprising:
a receiver configured to receive a first transmission signal transmitted from a first user terminal connected to the radio communication device and receive a second transmission signal transmitted from a second user terminal; and
a processor configured to notify of at least one of information indicating a first resource element to which the first transmission signal generated by the analog transmission scheme is mapped and information indicating a second resource element to which the second transmission signal generated by the analog transmission scheme is mapped.

24. The radio communication apparatus according to claim 23, wherein
the first resource element and the second resource element are set not to be overlapped in at least one of a frequency direction and a time direction.

25. The radio communication apparatus according to claim 24, wherein
the processor notifies the first user terminal of control information for making the first user terminal reduce interference onto the second resource element.

26. The radio communication apparatus according to claim 24, wherein
the second user terminal is a user terminal configured to be connected to the radio communication device, and
the processor notifies the second user terminal of control information for making the second user terminal reduce interference onto the first resource element.

27. The radio communication apparatus according to claim 23, wherein
the receiver receives the first transmission signal as a desired signal, and receives the second transmission signal as an interference signal,
the radio communication device further comprising:
a processor configured to perform an interference canceling process on a composite signal of the first transmission signal and the second transmission signal in the first resource element in a case where the second transmission signal generated by the digital transmission scheme is mapped to the first resource element, wherein
the interference canceling process includes a process of generating a replica of the second transmission signal in the first resource element and a process of subtracting the replica from the composite signal.

28. The radio communication apparatus according to claim 27, wherein
the second user terminal is a user terminal configured to be connected to another radio communication device, and
the processor acquires a transmission signal parameter from the another radio communication device, the transmission signal parameter being applied to the second transmission signal generated by the digital transmission scheme.

29. The radio communication apparatus according to claim 28, wherein
the processor notifies the another radio communication device of a resource block and a subframe including the first resource element in order to acquire the transmission signal parameter.

30. The radio communication apparatus according to claim 28, wherein
the transmission signal parameter includes at least one of the number of transmission antennas, a modulation and coding scheme (MCS), a redundancy version, a transmission mode, the number of layers, a transmission precoder matrix index (TPMI), a resource block, information indicating a demodulation reference signal (DMRS) sequence, setting information of a sounding reference signal (SRS), and a power difference between the DMRS and a physical uplink shared channel (PUSCH).

31. The radio communication apparatus according to claim 28, wherein
the process of generating the replica includes
a process of demodulating data contained in the second transmission signal in the first resource element on the basis of the transmission signal parameter, and
a process of generating the replica from the demodulated data.

* * * * *